US010609762B2

(12) United States Patent
Hughes et al.

(10) Patent No.: US 10,609,762 B2
(45) Date of Patent: Mar. 31, 2020

(54) METHOD, APPARATUS, AND COMPUTER PROGRAM PRODUCT IMPROVING BACKHAUL OF SENSOR AND OTHER DATA TO REAL TIME LOCATION SYSTEM NETWORK

(71) Applicant: Zebra Technologies Corporation, Lincolnshire, IL (US)

(72) Inventors: John K. Hughes, Coarsegold, CA (US); James J. O'Hagan, McHenry, IL (US); Cynthia Traeger, Fairfax, VA (US); Jill Stelfox, San Jose, CA (US); Bob Kuehne, Ann Arbor, MI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 459 days.

(21) Appl. No.: 14/298,012

(22) Filed: Jun. 6, 2014

(65) Prior Publication Data
US 2014/0361906 A1    Dec. 11, 2014

Related U.S. Application Data

(63) Continuation-in-part of application No. 13/942,316, filed on Jul. 15, 2013, now Pat. No. 9,002,485.
(Continued)

(51) Int. Cl.
*H04W 84/18* (2009.01)
*H04Q 9/00* (2006.01)

(52) U.S. Cl.
CPC ............. *H04W 84/18* (2013.01); *H04Q 9/00* (2013.01); *H04Q 2209/43* (2013.01); *H04Q 2209/47* (2013.01); *H04Q 2209/823* (2013.01)

(58) Field of Classification Search
CPC ..... H04W 84/18; H04Q 9/00; H04Q 2209/43; H04Q 2209/47; H04Q 2209/823
See application file for complete search history.

(56) References Cited

U.S. PATENT DOCUMENTS 3,732,500 A    5/1973    Dishal et al.
4,270,145 A    6/1981    Farina
(Continued)

FOREIGN PATENT DOCUMENTS

CN    102014397    4/2011
CN    203224631    10/2013
(Continued)

OTHER PUBLICATIONS

Swedberg, C., "N.J. Company Seeks to Market Passive Sensor RFID Tags", RFID Journal, Jun. 14, 2011, <http://www.rfidjournal.com/articles/pdf?8527>.
(Continued)

*Primary Examiner* — Amine Benlagsir

(57) ABSTRACT

Systems, methods, apparatuses, and computer readable media are disclosed for improving, in some examples, backhaul of sensor and other data to a real time location system (RTLS) network. In the context of a method for communication by a tag, the method includes receiving, at the tag, sensor data from at least one sensor, generating, using a processor of the tag, a tag blink data packet, the tag blink data packet including a tag identifier and at least a portion of the received sensor data, and transmitting the tag blink data packet.

43 Claims, 12 Drawing Sheets

Related U.S. Application Data

(60) Provisional application No. 61/831,990, filed on Jun. 6, 2013.

(56) References Cited

U.S. PATENT DOCUMENTS

| | | |
|---|---|---|
| 5,119,104 A | 6/1992 | Heller |
| 5,469,409 A | 11/1995 | Anderson et al. |
| 5,513,854 A | 5/1996 | Daver |
| 5,645,077 A | 7/1997 | Foxlin |
| 5,699,244 A | 12/1997 | Clark et al. |
| 5,901,172 A | 5/1999 | Fontana et al. |
| 5,920,287 A | 7/1999 | Belcher et al. |
| 5,930,741 A | 7/1999 | Kramer |
| 5,990,825 A | 11/1999 | Ito |
| 5,995,046 A | 11/1999 | Belcher et al. |
| 6,025,780 A | 2/2000 | Bowers et al. |
| 6,028,626 A | 2/2000 | Aviv |
| 6,121,926 A | 9/2000 | Belcher et al. |
| 6,176,837 B1 | 1/2001 | Foxlin |
| 6,204,813 B1 | 3/2001 | Wadell et al. |
| 6,366,242 B1 | 4/2002 | Boyd et al. |
| 6,380,894 B1 | 4/2002 | Boyd et al. |
| 6,593,885 B2 | 7/2003 | Wisherd et al. |
| 6,655,582 B2 | 10/2003 | Wohl et al. |
| 6,710,713 B1 | 3/2004 | Russo |
| 6,812,884 B2 | 11/2004 | Richley et al. |
| 6,836,744 B1 | 12/2004 | Asphahani et al. |
| 6,882,315 B2 | 4/2005 | Richley et al. |
| 7,009,638 B2 | 3/2006 | Gruber et al. |
| 7,061,376 B2 | 6/2006 | Wang et al. |
| 7,190,271 B2 | 3/2007 | Boyd |
| 7,667,604 B2 | 2/2010 | Ebert et al. |
| 7,671,802 B2 | 3/2010 | Walsh et al. |
| 7,710,322 B1 | 5/2010 | Ameti et al. |
| 7,751,971 B2 | 7/2010 | Chang et al. |
| 7,755,541 B2 | 7/2010 | Wisherd et al. |
| 7,899,006 B2 | 3/2011 | Boyd |
| 7,932,827 B2 | 4/2011 | Chand |
| 7,969,348 B2 | 6/2011 | Baker et al. |
| 8,041,369 B2 | 10/2011 | Smith et al. |
| 8,077,981 B2 | 12/2011 | Elangovan et al. |
| 8,269,835 B2 | 9/2012 | Grigsby |
| 8,279,051 B2 | 10/2012 | Khan |
| 8,568,278 B2 | 10/2013 | Riley et al. |
| 8,696,458 B2 | 4/2014 | Foxlin et al. |
| 8,705,671 B2 | 4/2014 | Ameti et al. |
| 8,731,239 B2 | 5/2014 | Gefen |
| 8,775,916 B2 | 7/2014 | Pulsipher et al. |
| 8,795,045 B2 | 8/2014 | Sorrells et al. |
| 8,842,002 B2 | 9/2014 | Rado |
| 8,780,204 B2 | 10/2014 | DeAngelis et al. |
| 8,989,880 B2 | 3/2015 | Wohl et al. |
| 9,081,076 B2 | 7/2015 | DeAngelis et al. |
| 9,381,645 B1 | 7/2016 | Yarlagadda et al. |
| 9,404,998 B2 | 8/2016 | Larose et al. |
| 9,489,552 B2 | 11/2016 | Hansen |
| 9,602,152 B2 | 3/2017 | Wohl |
| 2001/0010541 A1 | 8/2001 | Fernandez et al. |
| 2001/0030625 A1 | 10/2001 | Doles et al. |
| 2002/0004398 A1 | 1/2002 | Ogino et al. |
| 2002/0041284 A1 | 4/2002 | Konishi et al. |
| 2002/0114493 A1 | 8/2002 | McNitt et al. |
| 2002/0116147 A1 | 8/2002 | Vock et al. |
| 2002/0130835 A1 | 9/2002 | Brosnan |
| 2002/0135479 A1 | 9/2002 | Belcher et al. |
| 2003/0090387 A1 | 5/2003 | Lestienne et al. |
| 2003/0095186 A1 | 5/2003 | Aman et al. |
| 2003/0128100 A1 | 7/2003 | Burkhardt et al. |
| 2003/0163287 A1 | 8/2003 | Vock et al. |
| 2003/0227453 A1 | 12/2003 | Beier et al. |
| 2004/0022227 A1 | 2/2004 | Lynch et al. |
| 2004/0062216 A1 | 4/2004 | Nicholls et al. |
| 2004/0108954 A1 | 6/2004 | Richley et al. |
| 2004/0178960 A1 | 9/2004 | Sun |
| 2004/0249969 A1 | 12/2004 | Price |
| 2004/0260470 A1 | 12/2004 | Rast |
| 2004/0260828 A1 | 12/2004 | Price |
| 2005/0026563 A1 | 2/2005 | Leeper et al. |
| 2005/0031043 A1 | 2/2005 | Paquelet |
| 2005/0059998 A1 | 3/2005 | Norte et al. |
| 2005/0073418 A1 | 4/2005 | Kelliher et al. |
| 2005/0075079 A1 | 4/2005 | Jei et al. |
| 2005/0093976 A1 | 5/2005 | Valleriano |
| 2005/0148281 A1 | 7/2005 | Sanchez-Castro et al. |
| 2005/0207617 A1 | 9/2005 | Sarnoff |
| 2006/0067324 A1 | 3/2006 | Kim |
| 2006/0139167 A1 | 6/2006 | Davie et al. |
| 2006/0164213 A1 | 7/2006 | Burghard et al. |
| 2006/0202803 A1 | 9/2006 | Yoon |
| 2006/0252476 A1 | 11/2006 | Bahou |
| 2006/0264730 A1 | 11/2006 | Stivoric et al. |
| 2006/0271912 A1 | 11/2006 | Mickle et al. |
| 2006/0281061 A1 | 12/2006 | Hightower et al. |
| 2007/0018820 A1 | 1/2007 | Chand et al. |
| 2007/0091292 A1 | 4/2007 | Cho et al. |
| 2007/0176749 A1 | 8/2007 | Boyd et al. |
| 2007/0296723 A1 | 12/2007 | Williams |
| 2008/0065684 A1 | 4/2008 | Zilberman |
| 2008/0106381 A1 | 5/2008 | Adamec et al. |
| 2008/0113787 A1 | 5/2008 | Alderucci |
| 2008/0129825 A1 | 6/2008 | DeAngelis et al. |
| 2008/0140233 A1 | 6/2008 | Seacat |
| 2008/0186231 A1* | 8/2008 | Aljadeff .................. G01S 5/06 342/387 |
| 2008/0204248 A1 | 8/2008 | Winget et al. |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rodgers |
| 2008/0285805 A1 | 11/2008 | Luinge et al. |
| 2008/0291024 A1 | 11/2008 | Zhang et al. |
| 2009/0048044 A1 | 2/2009 | Oleson et al. |
| 2009/0141736 A1* | 6/2009 | Becker .................. H04W 74/08 370/441 |
| 2009/0195401 A1 | 8/2009 | Maroney et al. |
| 2009/0231198 A1 | 9/2009 | Walsh et al. |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |
| 2010/0117837 A1 | 5/2010 | Stirling et al. |
| 2010/0150117 A1 | 6/2010 | Aweya et al. |
| 2010/0228314 A1* | 9/2010 | Goetz .................. A61B 5/0031 607/41 |
| 2010/0250305 A1 | 9/2010 | Lee et al. |
| 2010/0278386 A1 | 11/2010 | Hoeflinger |
| 2010/0283603 A1 | 11/2010 | Alonso |
| 2010/0283630 A1 | 11/2010 | Alsono |
| 2010/0328073 A1 | 12/2010 | Nikitin et al. |
| 2011/0002223 A1* | 1/2011 | Gross .................. H04L 47/10 370/235 |
| 2011/0025847 A1 | 2/2011 | Park et al. |
| 2011/0054782 A1 | 3/2011 | Kaahui et al. |
| 2011/0063114 A1 | 3/2011 | Ikoyan |
| 2011/0084806 A1 | 4/2011 | Perkins et al. |
| 2011/0134240 A1 | 6/2011 | Anderson et al. |
| 2011/0140970 A1 | 6/2011 | Fukagawa et al. |
| 2011/0151953 A1 | 6/2011 | Kim et al. |
| 2011/0159939 A1 | 6/2011 | Lin et al. |
| 2011/0169959 A1 | 7/2011 | DeAngelis et al. |
| 2011/0188513 A1* | 8/2011 | Christoffersson ..... H04W 28/06 370/465 |
| 2011/0195701 A1 | 8/2011 | Cook et al. |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0015665 A1* | 1/2012 | Farley .................. G01S 5/0036 455/456.1 |
| 2012/0024516 A1 | 2/2012 | Bhadurt et al. |
| 2012/0042326 A1* | 2/2012 | Jain .................. A61B 5/00 719/318 |

(56) References Cited

U.S. PATENT DOCUMENTS

| | | | |
|---|---|---|---|
| 2012/0057489 A1* | 3/2012 | Shiotsuki | H04W 40/12 370/252 |
| 2012/0057634 A1 | 3/2012 | Shi et al. | |
| 2012/0057640 A1 | 3/2012 | Shi et al. | |
| 2012/0065483 A1 | 3/2012 | Chung et al. | |
| 2012/0081531 A1 | 4/2012 | DeAngelis et al. | |
| 2012/0112904 A1 | 5/2012 | Nagy et al. | |
| 2012/0126973 A1 | 5/2012 | Deangelis et al. | |
| 2012/0136231 A1 | 5/2012 | Markel | |
| 2012/0139708 A1 | 6/2012 | Paradiso et al. | |
| 2012/0184878 A1 | 7/2012 | Najafi et al. | |
| 2012/0212505 A1 | 8/2012 | Burroughs et al. | |
| 2012/0218301 A1 | 8/2012 | Miller | |
| 2012/0225676 A1 | 9/2012 | Boyd et al. | |
| 2012/0246795 A1 | 10/2012 | Scheffler et al. | |
| 2012/0256745 A1 | 10/2012 | Plett et al. | |
| 2012/0268239 A1 | 10/2012 | Ljung et al. | |
| 2013/0003860 A1 | 1/2013 | Sasai et al. | |
| 2013/0021142 A1 | 1/2013 | Matsui et al. | |
| 2013/0021206 A1 | 1/2013 | Hach et al. | |
| 2013/0040574 A1* | 2/2013 | Hillyard | H04W 8/005 455/41.2 |
| 2013/0041590 A1 | 2/2013 | Burich et al. | |
| 2013/0057392 A1* | 3/2013 | Bullock | G06K 7/10029 340/10.5 |
| 2013/0066448 A1 | 3/2013 | Alonso | |
| 2013/0076645 A1 | 3/2013 | Anantha et al. | |
| 2013/0096704 A1 | 4/2013 | Case | |
| 2013/0138386 A1 | 5/2013 | Jain et al. | |
| 2013/0142384 A1 | 6/2013 | Ofek | |
| 2013/0147608 A1 | 6/2013 | Sadr | |
| 2013/0257598 A1 | 10/2013 | Kawaguchi et al. | |
| 2013/0339156 A1 | 12/2013 | Sanjay et al. | |
| 2014/0038544 A1 | 2/2014 | Jones et al. | |
| 2014/0055588 A1 | 2/2014 | Bangera et al. | |
| 2014/0062728 A1 | 3/2014 | Soto et al. | |
| 2014/0077934 A1 | 3/2014 | Schwiers | |
| 2014/0145828 A1 | 5/2014 | Bassan-Eskenazi | |
| 2014/0148196 A1 | 5/2014 | Bassan-Eskenazi | |
| 2014/0156036 A1 | 6/2014 | Huang | |
| 2014/0170607 A1 | 6/2014 | Hsiao et al. | |
| 2014/0221137 A1 | 8/2014 | Krysiak et al. | |
| 2014/0301427 A1 | 10/2014 | Khalaf-Allah | |
| 2014/0320660 A1 | 10/2014 | DeAngelis et al. | |
| 2014/0347193 A1 | 11/2014 | Ljung et al. | |
| 2014/0361875 A1 | 12/2014 | O'Hagan et al. | |
| 2014/0361906 A1 | 12/2014 | Hughes et al. | |
| 2014/0364141 A1 | 12/2014 | O'Hagan et al. | |
| 2014/0365415 A1 | 12/2014 | Stelfox et al. | |
| 2015/0002272 A1 | 1/2015 | Alonso et al. | |
| 2015/0057981 A1 | 2/2015 | Gross | |
| 2015/0085111 A1 | 3/2015 | Lavery | |
| 2015/0097653 A1 | 4/2015 | Gibbs et al. | |
| 2015/0358852 A1 | 12/2015 | Richley et al. | |
| 2015/0360133 A1 | 12/2015 | MacCallum et al. | |
| 2015/0375041 A1 | 12/2015 | Richley et al. | |
| 2015/0375083 A1 | 12/2015 | Stelfox et al. | |
| 2015/0379387 A1 | 12/2015 | Richley | |
| 2016/0059075 A1 | 3/2016 | Molyneux et al. | |
| 2016/0097837 A1 | 4/2016 | Richley et al. | |

FOREIGN PATENT DOCUMENTS

| | | |
|---|---|---|
| EP | 1235077 A2 | 8/2002 |
| EP | 1241616 A2 | 9/2002 |
| EP | 1253438 A2 | 10/2002 |
| EP | 1503513 A1 | 2/2005 |
| EP | 2474939 A1 | 11/2012 |
| WO | WO-1998005977 AI | 2/1998 |
| WO | WO 1999/061936 A1 | 12/1999 |
| WO | WO 01008417 | 2/2001 |
| WO | WO 2006/022548 | 3/2006 |
| WO | WO-2010/083943 A1 | 7/2010 |
| WO | WO 2015/051813 A1 | 4/2014 |
| WO | WO 2014197600 | 12/2014 |

OTHER PUBLICATIONS

U.S. Appl. No. 14/296,703, filed Jun. 5, 2014; In re: Alonso et al., entitle Method and Apparatus for Associating Radio Frequency Identification Tags with Participants.

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects".

International Search Report and Written Opinion for International Application No. PCT/IB2015/059264 dated Feb. 10, 2016.

Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.

International Search Report and Written Opinion for International Application No. PCT/US2015/034267 dated Sep. 25, 2015.

International Search Report and Written Opinion for International Application No. PCT/IB2015/054103 dated Aug. 14, 2015.

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.

International Search Report and Written Opinion for International Application No. PCT/IB2015/054213 dated Aug. 6, 2015.

Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.

Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

International Search Report and Written Opinion for International Application PCT/IB2015/054102 dated Nov. 4, 2015.

"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.

Bahle et al., "I See You: How to Improve Wearable Activity Recognition by Leveraging Information from Environmental Cameras," Pervasive Computing and Communications Workshops, IEEE International Conference, (Mar. 18-22, 2013).

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).

Complaint before the United States District Court of Massachusetts, Civil Action No. 1:15-cv-12297, *Lynx System Developers, Inc. et al. V. Zebra Enterprise Solutions Corporation et al.*, filed Mar. 23, 2016.

Defendant's Answer to Complaint before the United States District Court of Massachusetts, Civil Action No. 1:15-cv-12297, *Lynx System Developers, Inc. et al. V. Zebra Enterprise Solutions Corporation et al.*, filed Apr. 6, 2016.

International Search Report and Written Opinion from International Application No. PCT/US2014/040881 dated Nov. 4, 2014.

International Search Report and Written Opinion from International Application No. PCT/US2014/041062 dated Oct. 1, 2014.

International Search Report and Written Opinion from International Application No. PCT/US2014/040947 dated Oct. 9, 2014.

Swedberg, C., "N.J. Company Seeks to Market Passive Sensor RFID Tags," *RFID Journal*, Jun. 20, 2013.

Fontana, R.J., Richley, E., Barney, J., "Commercialization of an Ultra Wideband Precision Asset Location System," *2003 IEEE Conference on Ultra Wideband Systems and Technologies*, Nov. 16-19, 2003.

Gueziec, A., "Tracking Pitches for Broadcast Television," *Computer*, Aug. 7, 2002.

(56) References Cited

OTHER PUBLICATIONS

CattleLog Pro, *eMerge Interactive, Inc.*, Sebastian, FL, 2004.
Marchant, J., Secure Animal Identification and Source Verification, *JM Communications*, UK, 2002.
"A Guide to Using NLIS Approved Ear Tags and Rumen Boluses," National Livestock Identification Scheme, *Meat & Livestock Australia Limited*, North Sydney, Australia, May 2003.
King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888. htm).
"RFID in the Australian Meat and Livestock Industry," Allflex Australia Pty Ltd,Capalaba, QLD (AU), *Data Capture Suppliers Guide*, 2003-2004.
Invention to Pay Additional Fees/Partial International Search Report for PCT/IB2015/054099 dated Oct. 6, 2015.
International Search Report and Written Opinion for International Application No. PCT/IB2015/054099 dated Dec. 9, 2015.
International Search Report and Written Opinion from International Application No. PCT/US2014/040940 dated Dec. 17, 2014.
Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.
Swedberg, Claire, "USDA Researchers Develop System to Track Livestock Feeding Behavior Unobtrusively", RFID Journal, Jul. 18, 2013.
A. Mitrokotsa, et al., "Integrated RFID and Sensor Networks: Architectures and Applications," Auerbach Publications, CRC Press, Taylor & Francis Group (2009). ISBN 978-14-20077-77-3, (Chapter 18), pp. 511-535.
International Search Report for International Application No. PCT/US2014/053647 dated Dec. 19, 2014.
International Search Report and Written Opinion for International Application No. PCT/US2016/035614 dated Sep. 15, 2016.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.
Office Action issued in connection with Chinese Patent Application No. 201580036162.3 dated Jul. 11, 2019.

\* cited by examiner

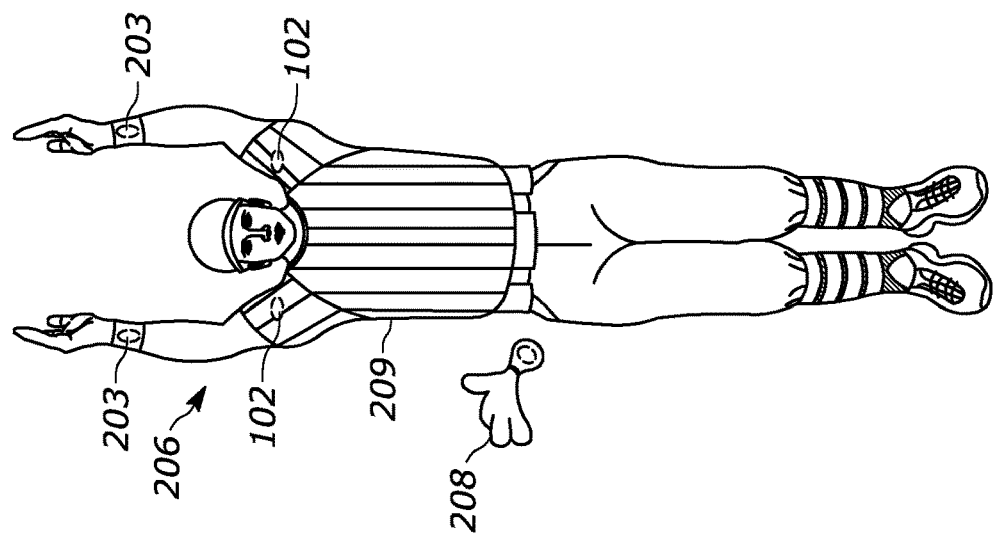
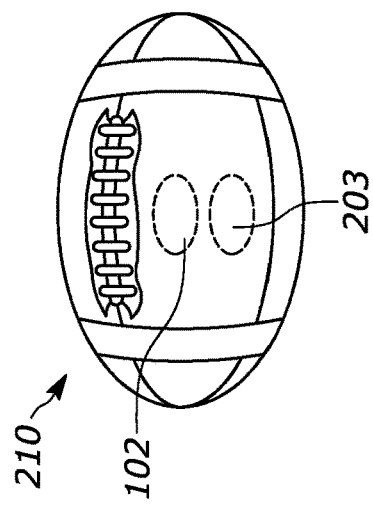
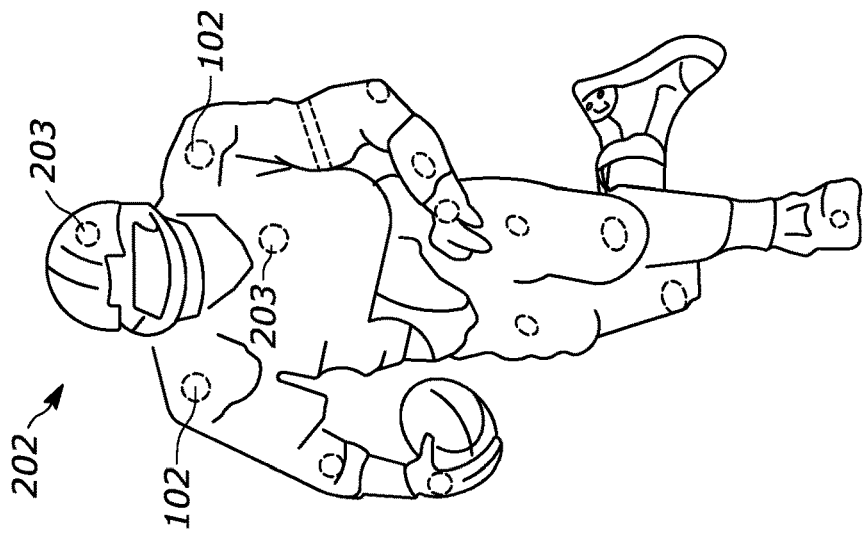

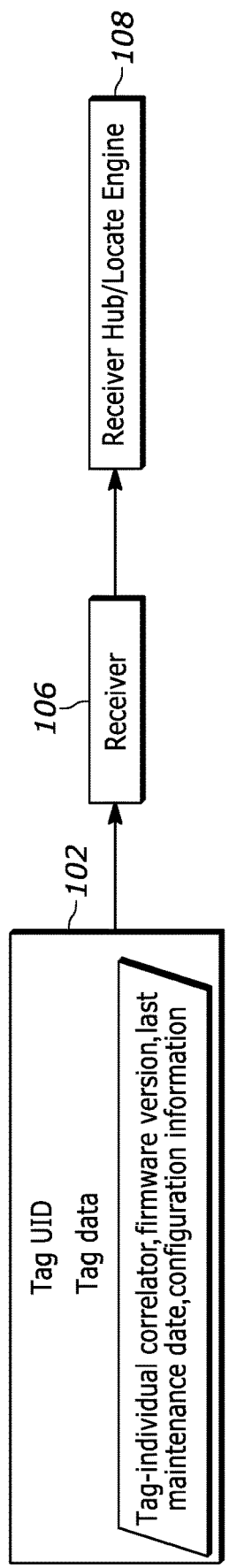
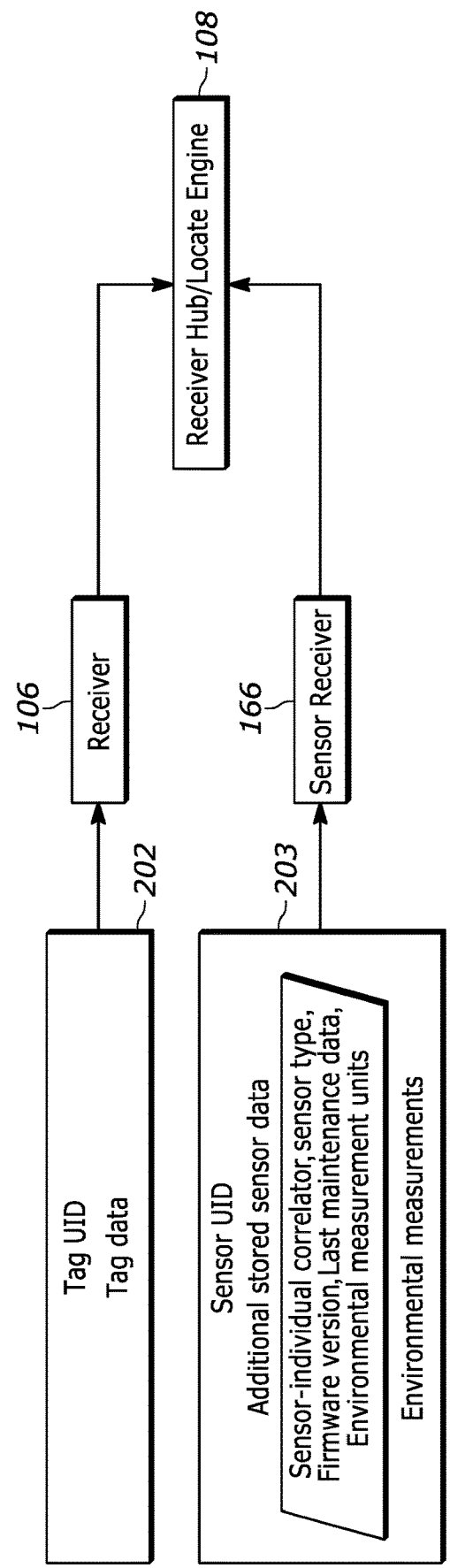

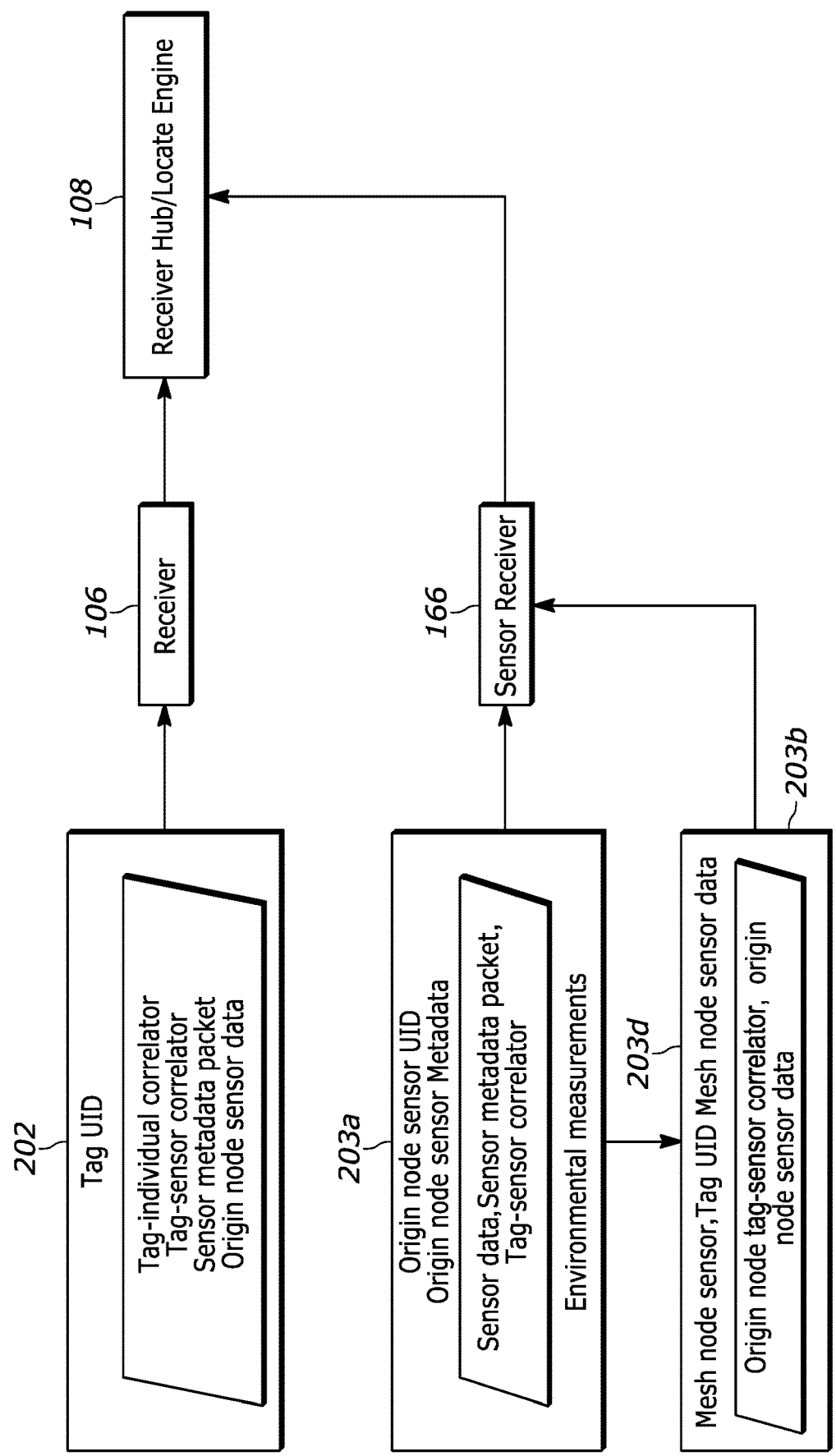

US 10,609,762 B2

METHOD, APPARATUS, AND COMPUTER PROGRAM PRODUCT IMPROVING BACKHAUL OF SENSOR AND OTHER DATA TO REAL TIME LOCATION SYSTEM NETWORK

CROSS-REFERENCE TO RELATED APPLICATION

This application claims priority from and the benefit of the filing date of U.S. Provisional Patent Application No. 61/831,990 filed Jun. 6, 2013 the contents of which are incorporated by reference in its entirety herein.

This application is a continuation in part of U.S. patent application Ser. No. 13/942,316 filed Jul. 15, 2013, which claims priority from and the benefit of the filing date of U.S. Provisional Patent Application No. 61/831,990 filed Jun. 6, 2013 the contents of which are incorporated by reference in its entirety herein.

FIELD

Embodiments discussed herein are related to radio frequency locating and, more particularly, to systems, methods, apparatus, computer readable media for improving backhaul of sensor and other data to real time location system (RTLS) network.

BACKGROUND

A number of deficiencies and problems associated with backhauling sensor and other data to an RTLS network are identified herein. Through applied effort, ingenuity, and innovation, exemplary solutions to many of these identified problems are embodied by the present invention, which is described in detail below.

BRIEF SUMMARY

Systems, methods, apparatus, and computer readable media are disclosed for improving backhaul of sensor and other data to an (RTLS) network. In an embodiment a method is provided for communication by a tag, the method including receiving, at the tag, sensor data from at least one sensor, generating, using a processor of the tag, a tag blink data packet, wherein the tag blink data packet comprises a tag identifier and at least a portion of the received sensor data, and transmitting the tag blink data packet. In an example embodiment of the method, the sensor data comprises sensor metadata. In an example embodiment of the method, the sensor data is video data. In an example embodiment of the method, the sensor data is audio data.

In an example embodiment of the method, the sensor data is heart rate data. In an example embodiment of the method, the sensor data is temperature data. In an example embodiment of the method, the transmitting the tag blink data packet complies with 47 CFR 15.517 technical requirements for indoor ultra-wide band systems. In an example embodiment of the method, the transmitting the tag blink data packet complies with 47 CFR 15.519 technical requirements for hand held ultra-wide band systems. In some embodiments, the method also includes determining the receipt of a transmission reliability signal, and the transmitting the tag blink data packet is based on the determination of receipt of the transmission reliability signal.

In an example embodiment of the method, sensor data is received through wired communication between the sensor and the tag. In an example embodiment of the method, sensor data is received through wireless communication between the sensor and the tag. In an example embodiment of the method, the sensor data is received through a mesh network.

In another example embodiment a method is provided including generating a tag-sensor correlator based on an association between a sensor and a tag, generating sensor data, the sensor data including environmental measurements and the tag-sensor correlator, and transmitting sensor data. In an example embodiment, the method also includes receiving origin node sensor data through a mesh network, and transmitting sensor data further comprises transmitting the origin node sensor data. In some example embodiments, the method includes determining if origin node sensor data satisfies a predetermined message count threshold, and the transmitting origin node sensor data is based on the determination of origin node sensor data satisfying the message count predetermined threshold.

In an example embodiment of the method, the message count is a transmission count. In an example embodiment of the method, the message count is a time count. In an example embodiment of the method, the message count is based on an environmental measurement. In an example embodiment of the method, the message count is based on an object associated with the tag. In an example embodiment of the method, the transmitting sensor data is Bluetooth low energy. In some example embodiments of the method, the transmitting sensor data is Wi-Fi.

In an example embodiment of the method, the transmitting sensor data is near field communication. In an example embodiment of the method, the sensor data comprises a sensor metadata. In an example embodiment, the method also includes segmenting sensor data, associating a sensor data identifier to the segmented sensor data, and the sensor metadata comprises the sensor data identifier of the segmented sensor data. In a further example embodiment, the method also includes setting a sensor data float value, and the generating sensor data is further based on the sensor data float value. In yet another example embodiment, the method may also include setting a sensor data threshold value, determining if the sensor data satisfies the sensor data threshold value, and the transmitting sensor data is further based on the determination the sensor data satisfying the sensor data threshold value. In an example embodiment, the method may also include determining the receipt of a transmission reliability signal, and the transmitting sensor data is based on the determination of receipt of the transmission reliability signal.

In another example embodiment a method is provided including generating a tag-sensor correlator based on an association between a sensor and a tag, generating sensor data, wherein the sensor data comprises environmental measurements and the tag-sensor correlator, and causing the tag to transmit the sensor data. In an example embodiment of the method, causing the tag to transmit the sensor data comprises generating a blink data packet wherein the blink data packet comprises the sensor data. In an example embodiment of the method, causing the tag to transmit the sensor data comprises associating a sensor data unique identifier to the sensor data. In an example embodiment of the method, causing the tag to transmit the sensor data comprises generating sensor metadata.

In an example embodiment of the method, causing the tag to transmit the sensor data comprises transmitting the sensor data in association with the tag sensor correlator. In an example embodiment of the method, the causing the tag to transmit the sensor data is based on a sensor data request. In an example embodiment, the method also includes causing the transmission of at least a portion of the sensor data from the sensor. In an example embodiment of the method, the at least a portion of sensor data is transmitted through a mesh network.

In a further example embodiment a method is provided including receiving tag derived data from a plurality of receivers, wherein the tag derived data comprises a tag identifier and at least a portion of sensor data, calculating, with a processor, tag location data based on the tag derived data packet, receiving a selected sensor data indication, correlating the at least a portion of sensor data with the selected sensor data indication, and causing the tag location data or the at least a portion sensor data to be displayed. In an example embodiment, the method also includes causing the tag location data or the at least a portion sensor data to be stored in a memory. In another example embodiment, the method also includes associating the tag location data with the at least a portion of sensor data. In further example embodiments, the tag derived data further comprises a tag-sensor correlator, the method also includes, receiving sensor data from at least one sensor, and associating the sensor data received from the sensor with the tag location data based on the tag-sensor correlator.

In an example embodiment of the method, the at least a portion of sensor data comprises sensor metadata. In an example embodiment of the method the tag derived data further comprises sensor metadata, the method also includes sequencing sensor data based on the sensor metadata. In an example embodiment, the method also includes requesting the sensor data based on the selected sensor data indication. In a further example embodiment, the method also includes synchronizing the tag location data and the sensor data.

In yet another embodiment a method is provided including receiving tag derived data from a plurality of receivers, wherein the tag derived data comprises a tag identifier and a backhaul sensor data, wherein the backhaul sensor data comprises a tag-sensor correlator, receiving sensor data from at least one sensor or sensor receiver and associating the received sensor data with a tag location data based on the tag-sensor correlator, synchronizing the backhaul sensor data with the received sensor data, wherein the received sensor data and backhaul sensor data comprise a sensor data unique identifier, and wherein synchronizing the backhaul sensor data and the received sensor data comprises associating the sensor data unique identifier of the backhaul sensor data and the received sensor data. In an example embodiment, the method also includes receiving a transmission reliability signal at a location tag and altering a blink rate of a location tag blink data transmission based on receiving the transmission reliability signal.

In an example embodiment of the method, the transmission reliability signal is received from a low frequency transceiver. In an example embodiment of the method, the transmission reliability signal is received from a Bluetooth beacon device. In an example embodiment of the method, the altering of the location tag blink rate comprises increasing the blink rate. In an example embodiment of the method, the altering of the location tag blink rate comprises decreasing the blink rate. In an example embodiment of the method, the altering of the location tag blink rate comprises terminating blink transmissions. In an example embodiment of the method, the altering of the location tag blink rate comprises commencing blink transmission.

In still further example embodiments, an apparatus is provided including at least one processor and at least one memory including computer program code, the at least one memory and computer program code configured to, with the processor, cause the apparatus to receive sensor data from at least one sensor, generate a tag blink data packet, wherein the tag blink data packet comprises a tag identifier and at least a portion of the received sensor data, and transmit the tag blink data packet. In an example embodiment of the apparatus, the sensor data comprises sensor metadata. In an example embodiment of the apparatus, the sensor data is video data. In an example embodiment of the apparatus, the sensor data is audio data. In an example embodiment of the apparatus, the sensor data is heart rate data. In an example embodiment of the apparatus, the sensor data is temperature data.

In an example embodiment of the apparatus, the transmitting the tag blink data packet complies with 47 CFR 15.517 technical requirements for indoor ultra-wide band systems. In an example embodiment of the apparatus, the transmitting the tag blink data packet complies with 47 CFR 15.519 technical requirements for hand held ultra-wide band systems. In some example embodiments, the at least one memory and computer program code are further configured to, with the processor, cause the apparatus to determine the receipt of a transmission reliability signal, and the transmitting the tag blink data packet is based on the determination of receipt of the transmission reliability signal. In an example embodiment of the apparatus, sensor data is received through wired communication between the sensor and the tag. In an example embodiment of the apparatus, the sensor data is received through wireless communication between the sensor and the tag. In an example embodiment of the apparatus, the sensor data is received through a mesh network.

In an example embodiment an apparatus is provided including at least one processor and at least one memory including computer program code, the at least one memory and computer program code configured to, with the processor, cause the apparatus to generate a tag-sensor correlator based on the association between a sensor and a tag; generate sensor data, the sensor data comprises environmental measurements and the tag-sensor correlator; and transmit sensor data. The at least one memory and computer program code of an example embodiment of the apparatus are further configured to, with the processor, cause the apparatus to receive origin node sensor data through a mesh network, and transmitting sensor data further comprises transmitting the origin node sensor data. In an example embodiment of the apparatus, the at least one memory and computer program code are further configured to, with the processor, cause the apparatus to determine if origin node sensor data satisfies a predetermined message count threshold and the transmitting origin node sensor data is based on the determination of origin node sensor data satisfying the message count predetermined threshold.

In an example embodiment of the apparatus, the message count is a transmission count. In an example embodiment of the apparatus, the message count is a time count. In an example embodiment of the apparatus, the message count is based on an environmental measurement. In an example embodiment of the apparatus, the message count is based on an object associated with the tag. In an example embodiment of the apparatus, the transmitting sensor data is Bluetooth low energy. In an example embodiment of the apparatus, the transmitting sensor data is Wi-Fi. In an example embodiment of the apparatus, transmitting sensor data is near field communication. In an example embodiment of the apparatus, the sensor data comprises a sensor metadata.

In an example embodiment of the apparatus, the at least one memory and computer program code are further configured to, with the processor, cause the apparatus to segment sensor data; associate a sensor data identifier to the segmented sensor data, and the sensor metadata comprises the sensor data identifier of the segmented sensor data. In some example embodiments of the apparatus, the at least one memory and computer program code are further configured to, with the processor, cause the apparatus to set a sensor data float value, the generating sensor data is further based on the sensor data float value. In another example embodiment of the apparatus the at least one memory and computer program code are further configured to, with the processor, cause the apparatus to set a sensor data threshold value, determine if the sensor data satisfies the sensor data threshold value, and the transmitting sensor data is further based on the determination the sensor data satisfying the sensor data threshold value. In still a further embodiment of the apparatus the at least one memory and computer program code are further configured to, with the processor, cause the apparatus to determine the receipt of a transmission reliability signal, and the transmitting sensor data is based on the determination of receipt of the transmission reliability signal.

In a further example embodiment, an apparatus is provided including at least one processor and at least one memory including computer program code, the at least one memory and computer program code configured to, with the processor, cause the apparatus to generate a tag-sensor correlator based on an association between a sensor and a tag, generate sensor data, the sensor data including environmental measurements and the tag-sensor correlator, and cause the tag to transmit the sensor data.

In an example embodiment of the apparatus, causing the tag to transmit the sensor data comprises generating a blink data packet wherein the blink data packet comprises the sensor data. In an example embodiment of the apparatus, causing the tag to transmit the sensor data comprises associating a sensor data unique identifier to the sensor data. In an example embodiment of the apparatus, causing the tag to transmit the sensor data comprises generating sensor metadata. In an example embodiment of the apparatus, causing the tag to transmit the sensor data comprises transmitting the sensor data in association with the tag-sensor correlator. In an example embodiment of the apparatus, the causing the tag to transmit the sensor data is based on a sensor data request.

In an example embodiment of the apparatus, the at least one memory and computer program code are further configured to, with the processor, cause the apparatus to cause the transmission of at least a portion of the sensor data from the sensor. In an example embodiment of the apparatus, the at least a portion of sensor data is transmitted through a mesh network.

In still further embodiments an apparatus is provided including at least one processor and at least one memory including computer program code, the at least one memory and computer program code configured to, with the processor, cause the apparatus to receive tag derived data from a plurality of receivers, wherein the tag derived data comprises a tag identifier and at least a portion of sensor data, calculate, with a processor, tag location data based on the tag derived data; receive a selected sensor data indication, correlating the at least a portion of sensor data with the selected sensor data indication, and cause the tag location data or the at least a portion of sensor data to be displayed. In an example embodiment of the apparatus, the at least one memory and computer program code are further configured to, with the processor, cause the apparatus to cause the tag location data or the at least a portion of sensor data to be stored in a memory.

In some example embodiments of the apparatus, the at least one memory and computer program code are further configured to, with the processor, cause the apparatus to associate the tag location data with the at least a portion of sensor data. In another example embodiment of the apparatus, the tag derived data further comprises a tag-sensor correlator, wherein the at least one memory and computer program code are further configured to, with the processor, cause the apparatus to receive sensor data from at least one sensor, and associate the sensor data received from the sensor with the tag location data based on the tag-sensor correlator. In an example embodiment of the apparatus, the at least a portion of sensor data comprises sensor metadata.

In some example embodiments of the apparatus, the tag derived data further comprises sensor metadata, wherein the at least one memory and computer program code are further configured to, with the processor, cause the apparatus to sequence sensor data based on the sensor metadata. In an example embodiment of the apparatus, the at least one memory and computer program code are further configured to, with the processor, cause the apparatus to request the sensor data based on the selected sensor data indication. In further example embodiments of the apparatus, the at least one memory and computer program code are further configured to, with the processor, cause the apparatus to synchronize the tag location data and the sensor data.

In another example embodiment, apparatus is provided including at least one processor and at least one memory including computer program code, the at least one memory and computer program code configured to, with the processor, cause the apparatus to receive tag derived data from a plurality of receivers, wherein the tag derived data comprises a tag identifier and a backhaul sensor data, the backhaul sensor data includes a tag-sensor correlator, receive sensor data from at least one sensor or sensor receiver, associate the received sensor data received with a tag location data based on the tag-sensor correlator, and synchronize the backhaul sensor data with the received sensor data, wherein the received sensor data and backhaul sensor data comprise a sensor data unique identifier, and wherein synchronizing the backhaul sensor data and the received sensor data from the sensor comprises associating the sensor data unique identifier of the backhaul sensor data and the received sensor data.

In still further example embodiments, an apparatus is provided including at least one processor and at least one memory including computer program code, the at least one memory and computer program code configured to, with the processor, cause the apparatus to receive a transmission reliability signal at a location tag, and alter a blink rate of a location tag blink data transmission based on receiving the transmission reliability signal. In an example embodiment of the apparatus, the transmission reliability signal is received from a low frequency transceiver.

In an example embodiment of the apparatus, the transmission reliability signal is received from a Bluetooth beacon device. In an example embodiment of the apparatus, the altering of the location tag blink rate comprises increasing the blink rate. In an example embodiment of the apparatus, the altering of the location tag blink rate comprises decreasing the blink rate. In an example embodiment of the apparatus, the altering of the location tag blink rate comprises terminating blink transmissions. In an example embodiment of the apparatus, the altering of the location tag blink rate comprises commencing blink transmission.

In still another example embodiment, a computer program product is provided including a non-transitory computer readable medium having program code portions stored thereon, the program code portions configured, upon execution to receive sensor data from at least one sensor, generate, a tag blink data packet, wherein the tag blink data packet comprises a tag identifier and at least a portion of the received sensor data, and transmit the tag blink data packet. In an example embodiment of the computer program product, the sensor data comprises sensor metadata.

In an example embodiment of the computer program product, the sensor data is video data. In an example embodiment of the computer program product, the sensor data is audio data. In an example embodiment of the computer program product, the sensor data is heart rate data. In an example embodiment of the computer program product, the sensor data is temperature data. In an example embodiment of the computer program product, the transmitting the tag blink data packet complies with 47 CFR 15.517 technical requirements for indoor ultra-wide band systems. In an example embodiment of the computer program product, the transmitting the tag blink data packet complies with 47 CFR 15.519 technical requirements for hand held ultra-wide band systems.

In some example embodiments of the computer program product the program code portions are further configured, upon execution to determine the receipt of a transmission reliability signal, and the transmitting the tag blink data packet is based on the determination of receipt of the transmission reliability signal. In an example embodiment of the computer program product, sensor data is received through wired communication between the sensor and the tag. In an example embodiment of the computer program product, the sensor data is received through wireless communication between the sensor and the tag. In an example embodiment of the computer program product, the sensor data is received through a mesh network.

In an example embodiment a computer program product is provided including a non-transitory computer readable medium having program code portions stored thereon, the program code portions configured, upon execution to generate a tag-sensor correlator based on an association between a sensor and a tag, generate sensor data, wherein the sensor data comprises environmental measurements and the tag-sensor correlator, and transmit sensor data. In an example embodiment of the computer program product, the program code portions are further configured, upon execution to receive origin node sensor data through a mesh network, and transmitting sensor data further comprises transmitting the origin node sensor data. In some example embodiments of the computer program product, the program code portions are further configured, upon execution to determine if origin node sensor data satisfies a predetermined message count threshold and the transmitting origin node sensor data is based on the determination of origin node sensor data satisfying the message count predetermined threshold.

In an example embodiment of the computer program product, the message count is a transmission count. In an example embodiment of the computer program product, the message count is a time count. In an example embodiment of the computer program product, the message count is based on an environmental measurement. In an example embodiment of the computer program product, the message count is based on an object associated with the tag. In an example embodiment of the computer program product, the transmitting sensor data is Bluetooth low energy. In an example embodiment of the computer program product, the transmitting sensor data is Wi-Fi. In an example embodiment of the computer program product, the transmitting sensor data is near field communication. In an example embodiment of the computer program product, the sensor data comprises a sensor metadata.

In an example embodiment of the computer program product, the program code portions are further configured, upon execution to segment sensor data, associate a sensor data identifier to the segmented sensor data, and the sensor metadata comprises the sensor data identifier of the segmented sensor data. In some example embodiments of the computer program product, the program code portions are further configured, upon execution to set a sensor data float value the generating sensor data is further based on the sensor data float value. In other example embodiments of the computer program product, the program code portions are further configured, upon execution to set a sensor data threshold value determine if the sensor data satisfies the sensor data threshold value, and the transmitting sensor data is further based on the determination the sensor data satisfying the sensor data threshold value.

In an example embodiment of the computer program product, the program code portions are further configured, upon execution to determine the receipt of a transmission reliability signal and the transmitting sensor data is based on the determination of receipt of the transmission reliability signal.

In a further example embodiment, a computer program product is provided including a non-transitory computer readable medium having program code portions stored thereon, the program code portions configured, upon execution to generate a tag-sensor correlator based on an association between a sensor and a tag generate sensor data, wherein the sensor data comprises environmental measurements and the tag-sensor correlator and cause the tag to transmit the sensor data. In an example embodiment of the computer program product, causing the tag to transmit the sensor data comprises generating a tag blink data packet wherein the tag blink data packet comprises the sensor data. In an example embodiment of the computer program product, causing the tag to transmit the sensor data comprises associating a sensor data unique identifier to the sensor data. In an example embodiment of the computer program product, causing the tag to transmit the sensor data comprises generating sensor metadata. In an example embodiment of the computer program product, causing the tag to transmit the sensor data comprises transmitting the sensor data in association with the tag-sensor correlator. In an example embodiment of the computer program product, the causing the tag to transmit the sensor data is based on a sensor data request.

In an example embodiment of the computer program product, the program code portions are further configured, upon execution to cause the transmission of at least a portion of the sensor data from the sensor. In an example embodiment of the computer program product, the at least a portion of sensor data is transmitted through a mesh network.

In yet another example embodiment, a computer program product is provided including a non-transitory computer readable medium having program code portions stored thereon, the program code portions configured, upon execution to receive tag derived data from a plurality of receivers, wherein the tag derived data comprises a tag identifier and at least a portion of sensor data, calculate tag location data based on the tag derived data, receive a selected sensor data indication, correlating the at least a portion of sensor data with the selected sensor data indication, and cause the tag location data or the at least a portion of sensor data to be displayed. In some example embodiments of the computer program product, the program code portions are further configured, upon execution to cause the tag location data or the at least a portion of sensor data to be stored in a memory. In further example embodiments of the computer program product, the program code portions are further configured, upon execution to associate the tag location data with the at least a portion of sensor data.

In an example embodiment of the computer program product, the tag derived data further comprises a tag-sensor correlator, wherein the program code portions are further configured, upon execution to receive sensor data from at least one sensor, and associate the sensor data received from the sensor with the tag location data based on the tag-sensor correlator. In an example embodiment of the computer program product, the at least a portion of sensor data comprises sensor metadata. In some example embodiments of the computer program product, the tag derived data further comprises sensor metadata, the program code portions are further configured, upon execution to sequence sensor data based on the sensor metadata.

In an example embodiment of the computer program product, the program code portions are further configured, upon execution to request the sensor data based on the selected sensor data indication. In some example embodiments of the computer program product, the program code portions are further configured, upon execution to synchronize the tga location data and the sensor data.

In another example embodiment a computer program product are provided including a non-transitory computer readable medium having program code portions stored thereon, the program code portions configured, upon execution to receive tag derived data from a plurality of receivers, wherein the tag derived data comprises a tag identifier and a backhaul sensor data, wherein the backhaul sensor data comprises a tag-sensor correlator, receive sensor data from at least one sensor or sensor receiver, associate the received sensor data with a tag location data based on the tag-sensor correlator, and synchronize the backhaul sensor data with the received sensor data, wherein the received sensor data and backhaul sensor data comprise a sensor data unique identifier, and wherein synchronizing the backhaul sensor data and the received sensor data comprises associating the sensor data unique identifier of the backhaul sensor data and the received sensor data.

In still another example embodiment a computer program product is provided including a non-transitory computer readable medium having program code portions stored thereon, the program code portions configured, upon execution to receive a transmission reliability signal at a location tag, and alter a blink rate of a location tag blink data transmission based on receiving the transmission reliability signal. In an example embodiment of the computer program product, the transmission reliability signal is received from a low frequency transceiver. In an example embodiment of the computer program product, the transmission reliability signal is received from a Bluetooth beacon device. In an example embodiment of the computer program product, the altering of the location tag blink rate comprises increasing the blink rate. In an example embodiment of the computer program product, the altering of the location tag blink rate comprises decreasing the blink rate. In an example embodiment of the computer program product, the altering of the location tag blink rate comprises terminating blink transmissions. In an example embodiment of the computer program product, the altering of the location tag blink rate comprises commencing blink transmission.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates an exemplary environment using a radio frequency locating system and sensors for determining a participant location or position in accordance with some embodiments of the present invention;

FIGS. 2A-C illustrate some exemplary participants carrying tags and sensors that may provide information for participant location or position determination in accordance with some embodiments of the present invention;

FIGS. 3A-3F illustrate block diagrams showing the input and output of receivers and sensor receivers in accordance with some embodiments of the present invention;

Figures 8, 9:
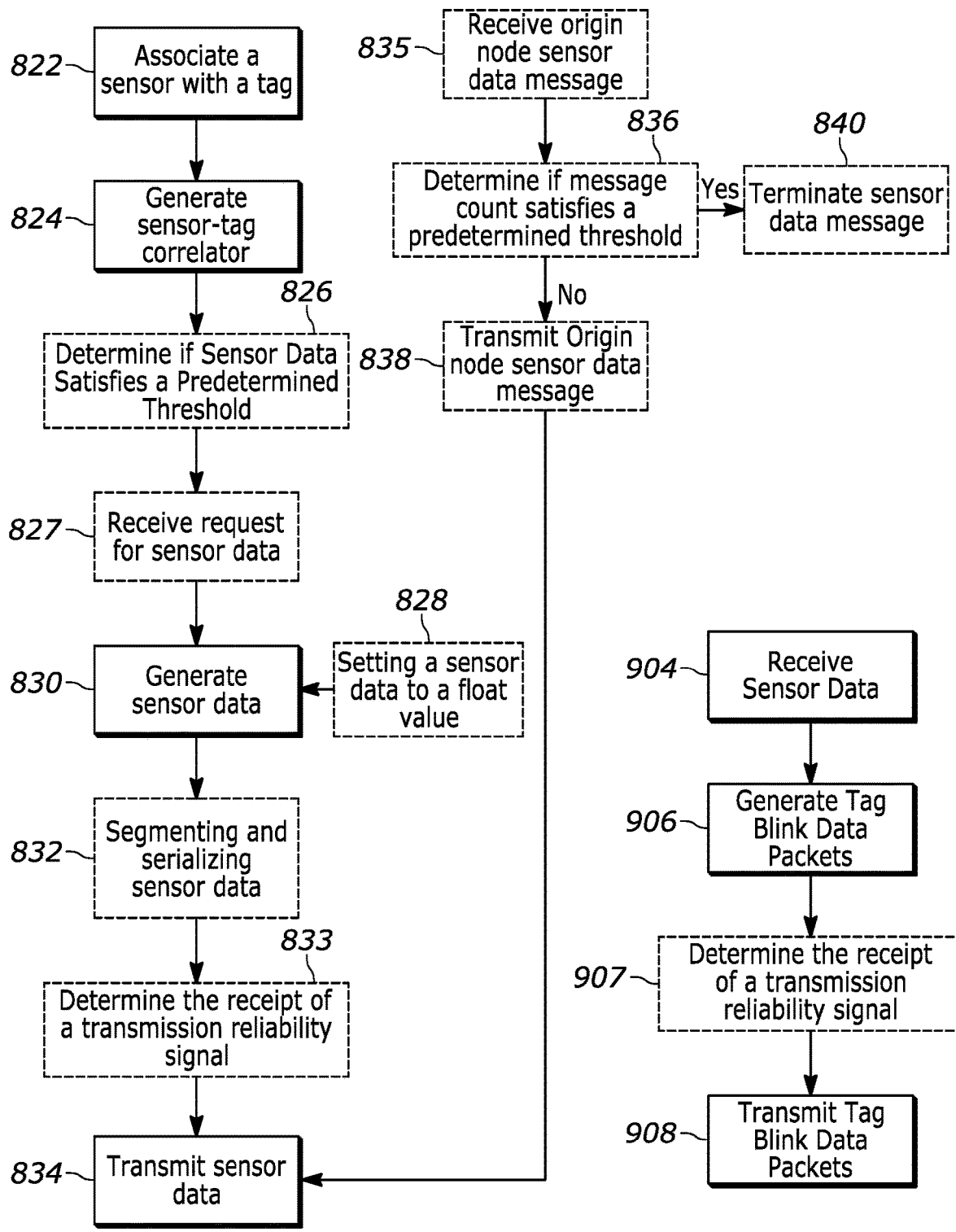
Figure 10:
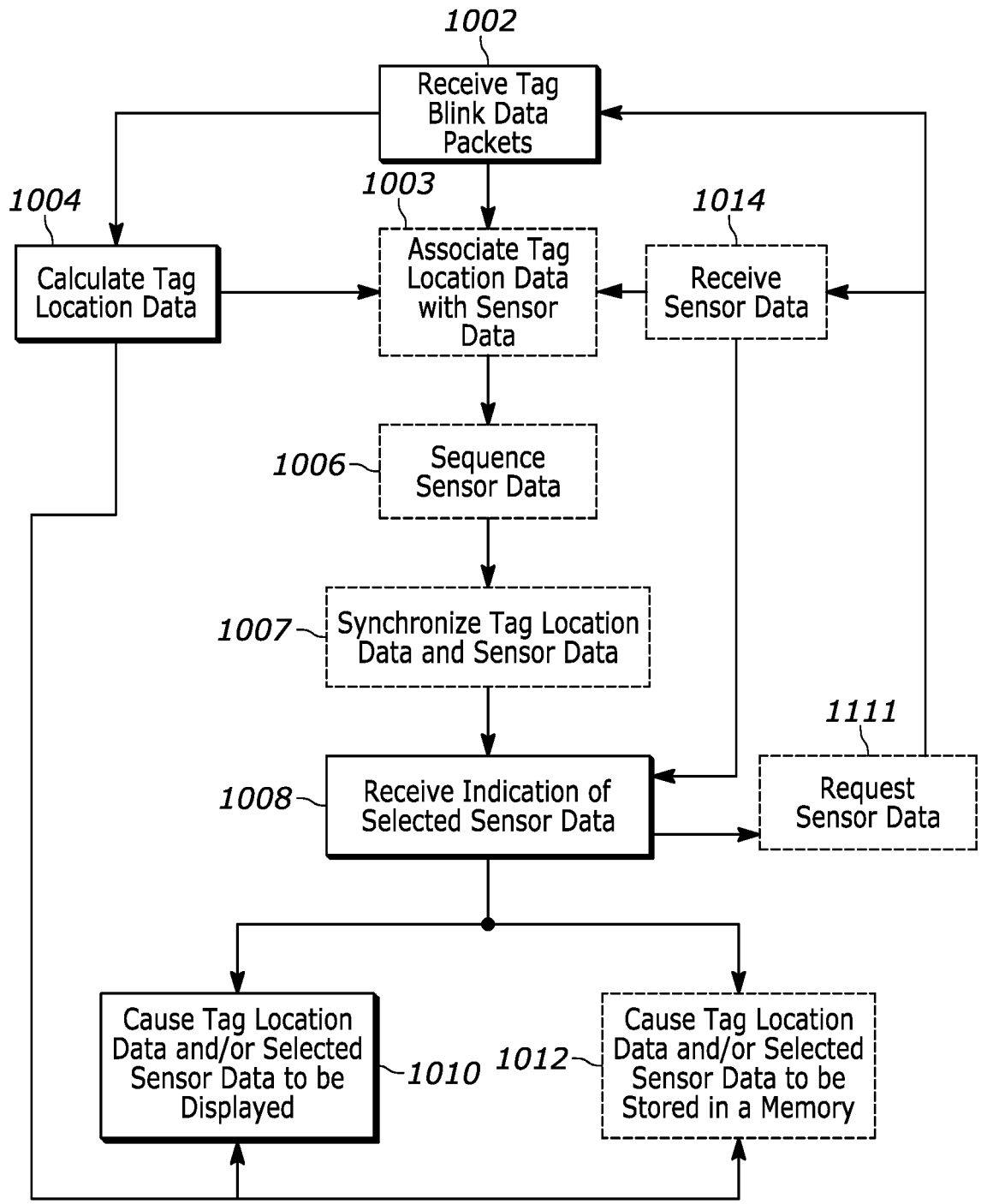

FIGS. 7, and 7A-C illustrate an exemplary block diagram of processing components of the location system in accordance with some example embodiments of the present invention;

FIG. 8 illustrates an exemplary process for generating and transmitting sensor data within the UWB framework in accordance with some example embodiments of the present invention;

FIG. 9 illustrates a flow chart of an exemplary process for transmitting tag blink data including sensor data within an UWB framework in accordance with some example embodiments of the present invention; and FIG. 10 illustrates an exemplary process for displaying tag location and selected sensor data in accordance with some example embodiments of the present invention.

DETAILED DESCRIPTION

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Some participant sensors such as video, audio, heart rate, temperature, or the like, delivered data by Wi-Fi, near field communication (NFC) or Bluetooth low energy (BLE) may require the sensor to be within a short distance of a receiver. The sensor's proximity to the receiver may limit the effective range of the transmission; therefore the sensor may not be able to deliver sensor data while the participant is away from that receiver, such as on the field of play in such sports as football or basketball, or running the race for a marathon, a triathlon, or the like. Additionally, ultra wide band (UWB) systems may be limited in data output due to FCC regulations such as 47 CFR 15.517[67 FR 34856, May 16, 2002; 67 FR 39632, Jun. 10, 2002] and 47 CFR 15.519[67 FR 34856, May 16, 2002; 67 FR 39632, Jun. 10, 2002], which limit the effective isotropical radiated power and the average resolution bandwidth. An increase in data throughput may require an increase in transmission time and therefore a decrease in peak power to maintain the average resolution bandwidth below the requirements of the FCC regulations. Since, there is a direct tradeoff between the amount of data sent over a UWB device and the peak power the device is allowed to broadcast, there is also a tradeoff between the amount of data sent and the maximum distance at which that data can be received.

In an example embodiment, UWB location systems may rely on the receipt of tag blink data, comprising a tag blink data packet, to calculate tag location. For a monitored environment of certain dimensions with a particular maximum tag transmission power, a tag blink data packet size may be defined, said tag blink data packet size having a maximum data capacity. A tag blink data packet comprising only a tag UID, or other small amount of data, may have significant data capacity that is unused. This unused capacity can be used to carry small amounts of sensor data or sensor data information packets. A tag in a UWB location system may thus transmit small amounts of sensor data or sensor data information packets such as heart rate, temperature, or sensor metadata in a UWB data payload of the tag blink data packet. The tag may transmit small amounts of sensor data, such as four bytes, as a portion of the UWB data payload of the tag blink data without increased tag blink data packet size. Additionally, because the sensor data is transmitted with the UWB tag blink data, the sensor data is received in real time and time associated with the UWB blink data and can be directly correlated with the real time location of the tag by the host system.

In an embodiment of the present invention, the UWB system may transmit sensor data metadata identifying the sensor data by location, time, characteristics, sensor data UID, or the like. The sensor data UID may be a serial number indicating the order of the data in a series, an alphanumeric identifier, or the like. The sensor metadata packet may be transmitted by UWB tags as a portion of the tag blink data packet. The sensor data itself, video, audio, heart rate, temperature, or the like, may be transmitted by the sensor to a sensor receiver through Wi-Fi, Bluetooth, cellular, such as 3G or 4G, serial, USB, Ethernet, infrared, NFC, passive RFID, or the like. A receiver, receiver hub, or receiver processing and distribution system may associate the tag location and time and sensor metadata packet with the received sensor data to allow synchronization of the tag data sensor metadata with the received sensor data.

In an example embodiment, the UWB location system may utilize the UWB data payload by segmenting sensor data and associating a sensor data UID with each segment. Each sensor data segment and associated sensor data UID is placed on the UWB data payload and transmitted with the tag data blink data packet. The receiver may receive and sequence the sensor data from the tag blink data packets therefore allowing the transmission of sensor data in real time to the receiver without reliance on Wi-Fi or cellular backhaul. Although each sensor data segment is relatively small in comparison to the total sensor data, the high blink rate allows for transmission of significant amounts of data over UWB in real time or near real time.

In an example embodiment, the UWB location system may use a mesh network to transmit sensor data from an origin sensor to a sensor receiver. Sensor data transmitted through a mesh network may be referred to as a sensor data message. A sensor that is the origin of a sensor data message may be referred to as an origin node. A sensor that receives and/or transmits a sensor data message from an origin node may be referred to as a mesh node. The mesh network may transmit on a Bluetooth Low Energy (BLE), Wi-Fi, NFC, or the like protocol. The origin node may transmit a sensor data message to mesh nodes within a radius of the origin node. The mesh nodes may relay the sensor data message throughout various receiving mesh nodes until the sensor data message is received at the sensor receiver. By utilizing at least a portion of the tag blink data packet UWB data payload for sensor metadata and transmitting sensor data through a mesh network the sensor data message may be received in real time or near real time and associated or synchronized with the real time and location data of the participant based on the UWB blink data, without the participant leaving the field of play or monitored area.

Example RF Locating System Architecture

Figure 1:
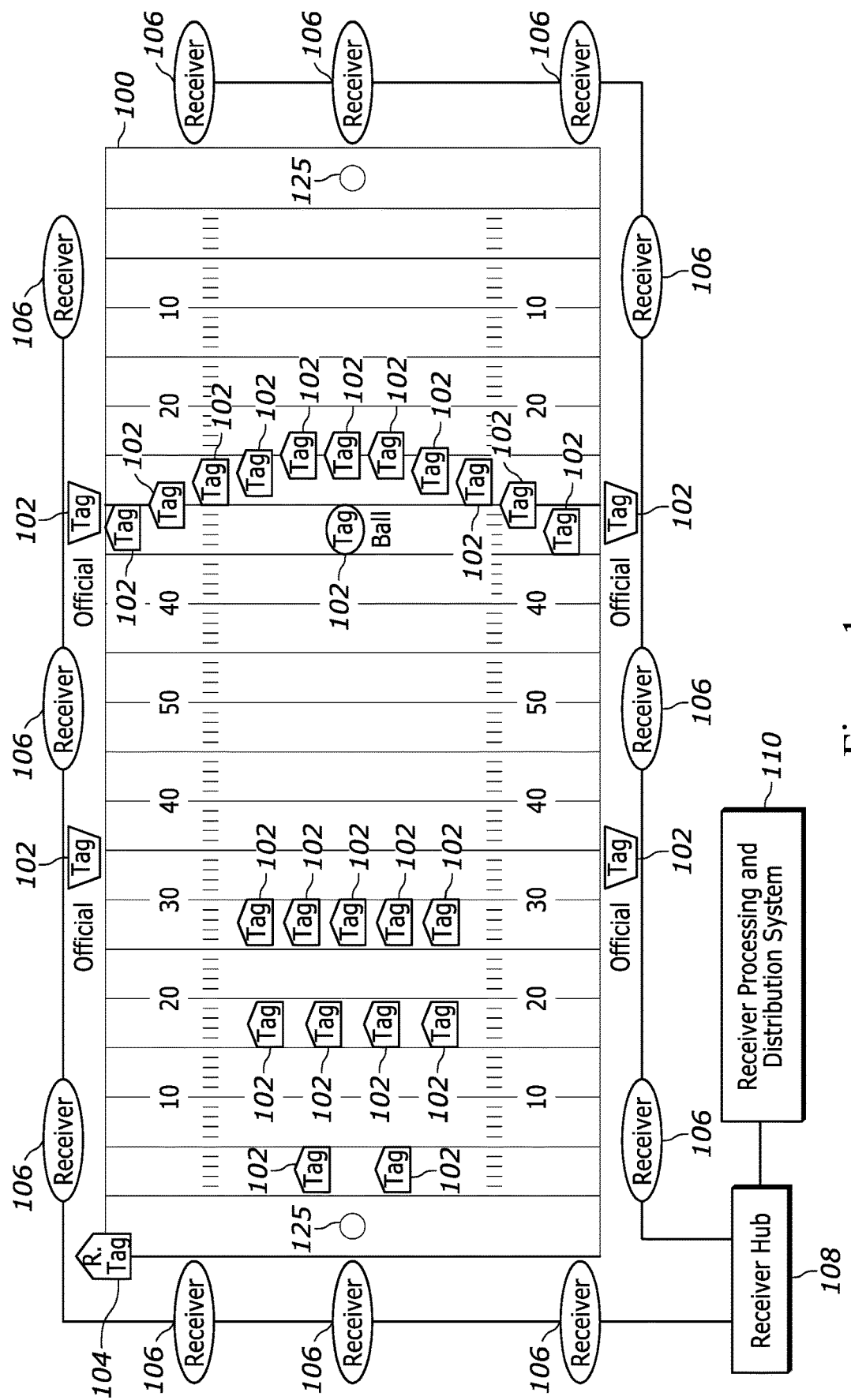

FIG. 1 illustrates an exemplary locating system 100 useful for calculating a location by an accumulation of location data or time of arrivals (TOAs) at a receiver hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to determine a phase offset between the counters associated with at least a subset of the of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Receiver hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Receiver hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the Receiver hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Receiver hub 108 (e.g., the data cables may enable a transfer speed of 2 Mbps). In some examples, measurement data is transferred to the Receiver hub at regular polling intervals.

As such, the Receiver hub 108 determines or otherwise computes tag location (i.e., object location) by processing TOA measurements relative to multiple data packets detected by the receivers 106. In some example embodiments, the Receiver hub 108 may be configured to resolve the coordinates of a tag using nonlinear optimization techniques.

In some examples, TOA measurements from multiple receivers 106 are processed by the Receiver hub 108 to determine a location of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated location coordinates ($x_0$, $y_0$, $z_0$) of the transmit tag 102 represents the measurement error for each respective TOA, and the minimization of the sum of the squares of the TOA measurement errors from each receiver participating in the DTOA location estimate provides for both the location coordinates ($x_0$, $y_0$, $z_0$) of the transmit tag and of that tag's transmit time $t_0$.

In some examples, the system described herein may be referred to as an "over-specified" or "over-determined" system. As such, the Receiver hub 108 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \Sigma_{j=1}^{N}[[(x-x_j)^2+(y-y_j)^2+(z-z_j)^2]^{1/2}-c(t_j-t_0)]^2 \quad (1)$$

Where N is the number of receivers, c is the speed of light, ($x_j$, $y_j$, $z_j$) are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\varepsilon$ in Equation 1 may be the Davidon-Fletcher-Powell (DFP)

quasi-Newton algorithm, for example. In some examples, the optimization algorithm to minimize the error ε in Equation 1 may be a steepest descent algorithm. In each case, the algorithms may be seeded with an initial location estimate (x, y, z) that represents the two-dimensional (2D) or three-dimensional (3D) mean of the positions of the receivers 106 that participate in the tag location determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{R_j}, y_{R_j}, z_{R_j})$, which are respectively positioned at distances $d_{R_j}$ from a reference tag 104, such as given in Equation 2:

$$d_{R_j} = \sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta\tau_R + O_j + \beta d_{R_j}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta\tau_i + O_j + \beta d_{ij}/c \quad (4)$$

sat receiver $R_j$ where $d_{ij}$ the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j}-d_{R_k}$ remains constant, (which means the receivers and reference tag are fixed and there is no multipath situation) and β is the same for each receiver. Note that $\Delta_{jk}$ is a known quantity, since $N_{R_j}$, $N_{R_k}$, β, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

In some example embodiments, the location of a tag 102 may then be output to a receiver processing and distribution system 110 for further processing of the location data to advantageously provide visualizations, predictive analytics, statistics and/or the like.

Example Tag/Sensor Positioning and Participant Correlation

FIGS. 2a-c illustrate some exemplary participants that may provide information to a performance analytics system in accordance with some embodiments of the present invention. FIG. 2a illustrates a player 202 (e.g., a football player) wearing equipment having attached tags 102 in accordance with some embodiments. In particular, the depicted player 202 is wearing shoulder pads having tags 102 affixed to opposite sides thereof. This positioning advantageously provides an elevated broadcast position for each tag 102 thereby increasing its communication effectiveness.

Additional sensors 203 may be attached to equipment worn by player 202, such as accelerometers, magnetometers, compasses, gyroscopes, time-of-flight sensors, health monitoring sensors (e.g., blood pressure sensors, heart monitors, respiration sensors, moisture sensors, temperature sensors), light sensors, video, audio or the like. The additional sensors 204 may be affixed to shoulder pads, the helmet, the shoes, rib pads, elbow pads, the jersey, the pants, a bodysuit undergarment, gloves, arm bands, wristbands, and the like. In some cases, additional sensors may be fastened to or implanted under the player's skin, swallowed, or otherwise be carried internally in the player's body.

Sensors 203 may be configured to communicate with receivers (e.g., receivers 106 of FIG. 1) directly or indirectly through tags 102 or other transmitters. For example, in one embodiment, a sensor 203 may be connected, wired (e.g., perhaps through wires sewn into a jersey or bodysuit undergarment) or wirelessly, to tags 102 to provide sensor data to tags 102, which is then transmitted to the receivers 106. In another embodiment, a plurality of sensors (not shown) may be connected to a dedicated antenna or transmitter, perhaps positioned in the helmet, which may transmit sensor data to one or more receivers. In addition to receiving sensor data directly from sensors or indirectly through tags, a receiver may also receive tag blink data packets from tags.

In an example embodiment, an array of tags 102 may be attached to the player, for example on the head, shoulders, wrists, hips, knees, elbows, feet, or the like, which may be used to determine the location of various portions of the player's body in relation to each other.

FIG. 2b illustrates a game official 206 wearing equipment having attached tags 102 and sensors 203 in accordance with some embodiments. In the depicted embodiment, tags 102 are attached to the official's jersey proximate opposite shoulders. Sensors 203 are positioned in wristbands worn on the official's wrists as shown. Sensors 203 may be configured to communicate with receivers (e.g., receivers 106 of FIG. 1) directly or indirectly through tags 102 or other transmitters as discussed above in connection with FIG. 2a.

As discussed in greater detail below, the positioning of sensors 203 (here, accelerometers) proximate the wrists of the official may allow the receiver processing and distribution system 110 to determine particular motions, movements, or activities of the official 206 for use in determining events (e.g., winding of the game clock, first down, touchdown, or the like). The official 206 may also carry other equipment, such as penalty flag 208, which may also have a tag 102 (and optionally one or more sensors) attached to provide additional data to the receiver processing and distribution system 110. For example, the receiver processing and distribution system 110 may use tag location data from the penalty flag 208 to determine when the official is merely carrying the penalty flag 208 versus when the official is using the penalty flag 208 to indicate an event, such as a penalty (e.g., by throwing the penalty flag 208).

FIG. 2c illustrates an example of a ball 210 having tags 102 attached or embedded in accordance with some embodiments. Additionally, sensors 203 may be attached to or embedded in the ball 210, such as accelerometers, time-of-flight sensors, or the like. In some embodiments, the sensor 203 may be connected, wired or wirelessly, to tag 102 to provide sensor data to tag 102 which is then transmitted to the receivers 106. In some embodiments, the sensor 203 may transmit sensor data to receivers separately from the tag 102, such as described above in connection with FIG. 2a.

As will be apparent to one of ordinary skill in the art in view of this disclosure, once the tags 102 and sensors 203 of FIGS. 2a-c are positioned on participants, they may be correlated to such participants. For example, in some embodiments, unique tag or sensor identifiers ("unique IDs") may be correlated to a participant profile (e.g., John Smith—running back, Fred Johnson—line judge official, or ID 027—one of several game balls, etc.) and stored to a remote database accessible to the performance analytics system as discussed in greater detail below. Each participant profile may further include or be correlated with a variety of data including, but not limited to, biometric data (e.g., height, weight, health data, etc.), role data, team ID, performance statistics, and other data that may be apparent to one of skill in the art in view of the foregoing description.

In some embodiments, such participant profile or role data may be pre-defined and stored in association with the unique tag or sensor identifiers. In other embodiments, the participant profile or role data may also be "learned" by the system as a result of received tag or sensor data, formation data, play data, event data, and/or the like. For example, in some embodiments the system may determine that a tag or sensor is not correlated to a participant profile and may analyze data received from the tag and/or sensor to determine possible participant roles, etc., which may be ranked and then selected/confirmed by the system or by a user after being displayed by the system. In some embodiments, the system may determine possible participant roles (i.e., participant role data) based on determined participant position data (e.g., movement patterns, alignment position, etc.).

In some embodiments, as described in greater detail below, the participant profile or role data may also be updated by the system (i.e., to produce a data set for the participant that is far more robust than that established at initial registration) as a result of received tag or sensor data, formation data, play data, event data, and/or the like. In some embodiments, the participant profile and/or role data may be used in a performance analytics system to weight the actions of the participants during analysis to assist in qualifying what is occurring, such as in determining formations, plays, events, etc.

Tag ID and Sensor Data Transmission Architecture

FIGS. 3A, 3B, 3C, 3D, 3E, and 3F show block diagrams of various different architectures that may be utilized in transmitting signals from one or more tags and sensors to one or more receivers of a receiver processing and analytics system in accordance with embodiments of the invention. In some embodiments, the depicted architectures may be used in connection with the receiver processing and analytics system 110 of FIG. 1. More than one of these architectures may be used together in a single system.

FIG. 3A shows a RF location tag 102, such as that shown in FIG. 1, which may be configured to transmit a tag signal to one or more receivers 106. The one or more receivers 106 may transmit a receiver signal to the receiver hub/locate engine 108.

The depicted RF location tag 102 may generate or store a tag unique identifier ("tag UID") and/or tag data as shown. The tag data may include useful information such as the installed firmware version, last tag maintenance date, configuration information, and/or a tag-individual correlator. The tag-individual correlator may comprise data that indicates that a monitored individual (e.g., participant) is associated with the RF location tag 102 (e.g. name, uniform number and team, biometric data, tag position on individual, i.e., right wrist). As will be apparent to one of skill in the art in view of this disclosure, the tag-individual correlator may be stored to the RF location tag 102 when the tag is registered or otherwise associated with an individual. While shown as a separate field for illustration purposes, one of ordinary skill in the art may readily appreciate that the tag-individual correlator may be part of any tag data or even omitted from the tag.

The tag signal transmitted from RF location tag 102 to receiver 106 may include "blink data" as it is transmitted at selected intervals. This "blink rate" may be set by the tag designer or the system designer to meet application requirements. In some embodiments it is consistent for one or all tags; in some embodiments it may be data dependent. Blink data includes characteristics of the tag signal that allow the tag signal to be recognized by the receiver 106 so the location of the RF location tag 102 may be determined by the locating system. Blink data may also comprise one or more tag blink data packets. Such tag blink data packets may include any data from the tag 102 that is intended for transmission such as, for example in the depicted embodiment, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a RF location tag 102 (e.g., a UWB tag).

The depicted receiver 106 receives the tag signal, which includes blink data and tag blink data packets as discussed above. In one embodiment, the receiver 106 may pass the received tag signal directly to the receive hub/locate engine 108 as part of its receiver signal. In another embodiment, the receiver 106 could perform some basic processing on the received tag signal. For instance, the receiver could extract blink data from the tag signal and transmit the blink data to the receive hub/locate engine 108. The receiver could transmit a time measurement to the receive hub/locate engine 108 such as a TOA measurement and/or a TDOA measurement. The time measurement could be based on a clock time generated or calculated in the receiver, it could be based on a receiver offset value as explained in FIG. 1 above, it could be based on a system time, and/or it could be based on the time difference of arrival between the tag signal of the RF location tag 102 and the tag signal of a RF reference tag (e.g., tag 104 of FIG. 1). The receiver 106 could additionally or alternatively determine a signal measurement from the tag signal (such as a received signal strength indication (RSSI)), a direction of signal, signal polarity, or signal phase) and transmit the signal measurement to the receive hub/locate engine 108.

FIG. 3B shows a RF location tag 202 and sensor 203, such as those worn on an individual's person as shown in FIG. 2, which may be configured to transmit tag signals and sensor signals, respectively, to one or more receivers 106, 166. The one or more receivers 106, 166 may then transmit receiver signals to the receiver hub/locate engine 108. One or more receivers 106, 166 may share physical components, such as a housing or antenna.

The depicted RF location tag 202 may comprise a tag UID and tag data (such as a tag-individual correlator) and transmit a tag signal comprising blink data as discussed in connection with FIG. 3A above. The depicted sensor 203 may generate and/or store a sensor UID, additional stored sensor data (e.g., a sensor-individual correlator, sensor type, sensor firmware version, last maintenance date, the units in which environmental measurements are transmitted, etc.), and environmental measurements. The "additional stored sensor data" of the sensor 203 may include any data that is intended for transmission, including but not limited to a RF location tag 202, a reference tag (e.g., 104 of FIG. 1), a sensor receiver, a receiver 106, and/or the receiver/hub locate engine 108.

The sensor-individual correlator may comprise data that indicates that a monitored individual is associated with the sensor 203 (e.g., name, uniform number and team, biometric data, sensor position on individual, i.e., right wrist). As will be apparent to one of skill in the art in view of this disclosure, the sensor-individual correlator may be stored to the sensor 203 when the sensor is registered or otherwise associated with an individual. While shown as a separate field for illustration purposes, one of ordinary skill in the art may readily appreciate that the sensor-individual correlator may be part of any additional stored sensor data or omitted from the sensor altogether.

Sensors such as sensor 203 that are structured according to embodiments of the invention may sense or determine one or more environmental conditions (e.g. temperature, pressure, pulse, heartbeat, rotation, velocity, acceleration, radiation, position, chemical concentration, voltage, audio, video) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from the environmental measurements.

In the embodiment depicted in FIG. 3B, RF location tag 202 transmits a tag signal to receiver 106 and sensor 203 transmits a sensor signal to sensor receiver 166. The sensor signal may comprise one or more sensor information packets. Such sensor information packets may include any data or information from the sensor 203 that is intended for transmission such as, for example in the depicted embodiment, sensor UID, additional stored sensor data, sensor-individual correlator, and environmental measurements. A receiver signal from receiver 106 and a sensor receiver signal from sensor receiver 166 may be transmitted via wired or wireless communication to receiver hub/locate engine 108 as shown.

Figures 3C, 3D:
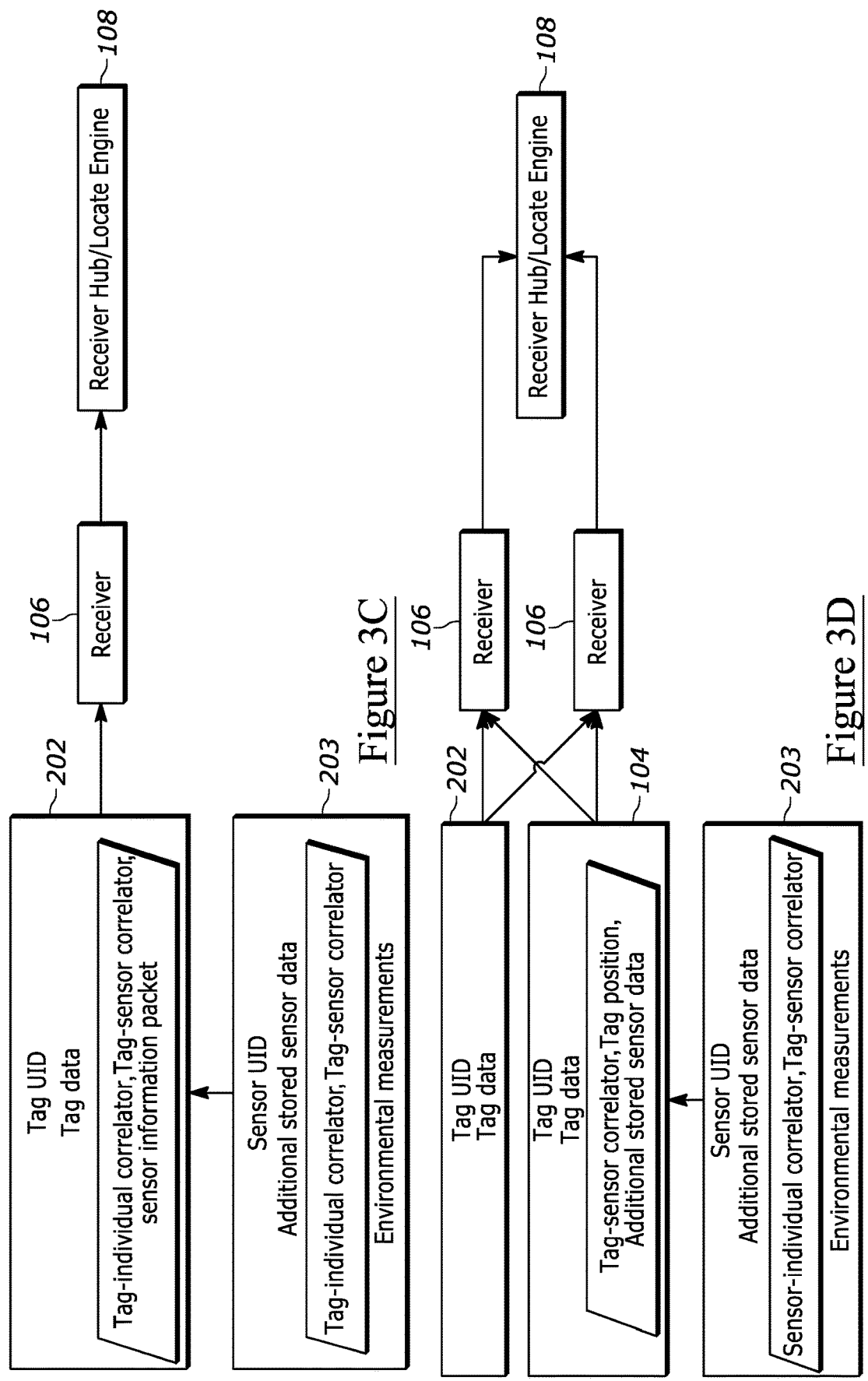

FIG. 3C depicts a sensor 203 communicating through a RF location tag 202 in accordance with various embodiments. In one embodiment, the sensor 203 may be part of (i.e., reside in the same housing or assembly structure) of the RF location tag 202. In another embodiment, the sensor 203 may be distinct from (i.e., not resident in the same housing or assembly structure) the RF location tag 202 but configured to communicate wirelessly or via wired communication with the RF location tag 202.

In one embodiment, the RF location tag 202, the sensor 203, or both, may generate and/or store a tag-sensor correlator that indicates an association between a RF location tag 202 and a sensor 203 (e.g., tag UID/sensor UID, distance from tag to sensor in a particular stance, set of sensors associated with a set of tags, sensor types associated with a tag, etc.). In the depicted embodiment, both the RF location tag 202 and the sensor 203 store the tag-sensor correlator.

In the depicted embodiment, sensor 203 transmits a sensor signal to RF location tag 202. The sensor signal may comprise one or more sensor information packets as discussed above. The sensor information packets may comprise the sensor UID, a sensor-individual correlator, additional stored sensor data, the tag-sensor correlator, and/or the environmental measurements. The RF location tag 202 may store some portion of, or all of, the sensor information packets locally and may package the sensor information packets into one or more tag blink data packets for transmission to receiver 106 as part of a tag signal or simply pass them along as part of its tag signal. In embodiments in which a portion of sensor data is transmitted as a portion of the tag signal of tag blink data packet it may herein be referred to as "backhaul sensor data."

FIG. 3D illustrates an example communication structure for a reference tag 104 (e.g., reference tag 104 of FIG. 1), an RF location tag 202, a sensor 203, and two receivers 106 in accordance with one embodiment. The depicted reference tag 104 is a RF location tag and thus may include tag data, a tag UID, and is capable of transmitting tag blink data packets. In some embodiments, the reference tag 104 may form part of a sensor and may thus be capable of transmitting sensor information packets.

The depicted sensor 203 transmits a sensor signal to RF reference tag 104. The RF reference tag 104 may store some portion or some or all of the sensor information packets locally and may package the sensor information packets into one or more tag blink data packets for transmission to receiver 106 as part of a tag signal, or simply pass them along as part of its tag signal.

As was described above in connection with FIG. 1, the receivers 106 of FIG. 3D are configured to receive tag signals from the RF location tag 202 and the reference tag 104. Each of these tag signals may include blink data, which may comprise tag UIDs, tag blink data packets, and/or sensor information packets. The receivers 106 each transmit receiver signals via wired or wireless communication to the receiver hub/locate engine 108 as shown.

Figure 3E:
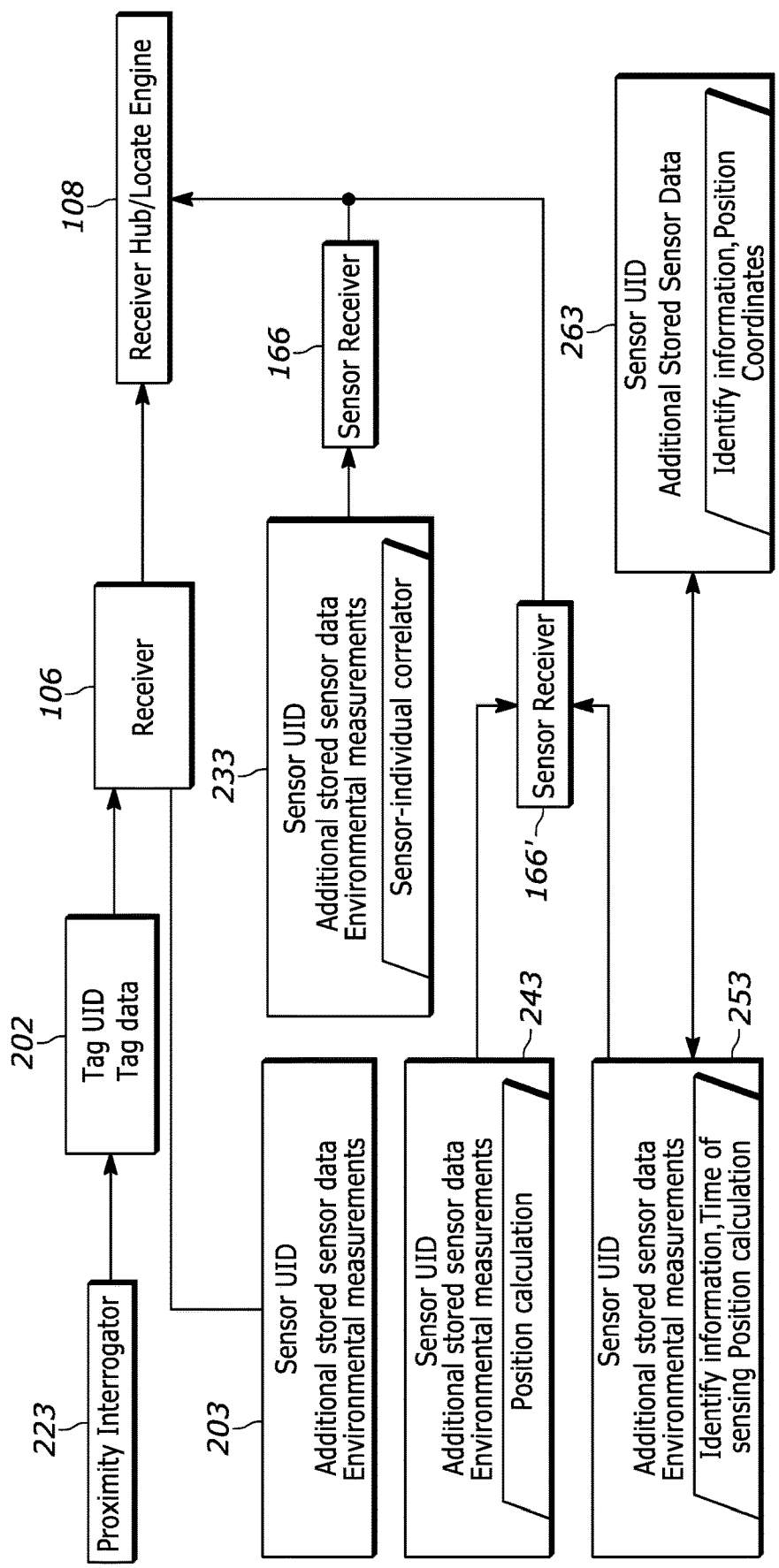

FIG. 3E illustrates an example communication structure between an RF location tag 202, a plurality of receivers 106, and a variety of sensor types including, without limitation, a sensor 203, a diagnostic device 233, a triangulation positioner 243, a proximity positioner 253, and a proximity label 263 in accordance with various embodiments. In the depicted embodiment, none of the sensors 203, 233, 243, 253 form part of an RF location tag 202 or reference tag 104. However, each may comprise a sensor UID and additional stored sensor data. Each of the depicted sensors 203, 233, 243, 253 transmits sensor signals comprising sensor information packets.

In the depicted embodiment, receiver 106 is configured to receive a tag signal from RF location tag 202 and a sensor signal directly from sensor 203. In such embodiments, sensor 203 may be configured to communicate in a communication protocol that is common to RF location tag 202 as will be apparent to one of ordinary skill in the art in view of this disclosure.

FIG. 3E depicts one type of sensor referred to herein as a "proximity interrogator". The proximity interrogator 223 can include circuitry operative to generate a magnetic, electromagnetic, or other field that is detectable by a RF location tag 202. While not shown in FIG. 3E, a proximity interrogator 223 may include a sensor UID and other tag and sensor derived data or information as discussed above.

In some embodiments, the proximity interrogator 223 is operative as a proximity communication device that can trigger a RF location tag 202 (e.g., when the RF location tag 202 detects the field produced by the proximity interrogator 223) to transmit blink data under an alternate blink pattern or blink rate. The RF location tag can initiate a preprogrammed (and typically faster) blink rate to allow more location points for tracking an individual. In some embodiments, the RF location tag may not transmit a tag signal until triggered by the proximity interrogator 223. In some embodiments the RF location tag 202 may be triggered when the RF location tag 202 moves near (e.g., within communication proximity to) a proximity interrogator 223. In some embodiments, the RF location tag may be triggered when the proximity interrogator 223 moves near to the RF location tag 202.

In other embodiments, the RF location tag 202 may be triggered when a button is pressed or a switch is activated on the proximity interrogator 223 or on the RF location tag itself. For example, a proximity interrogator 223 could be placed at the start line of a racetrack. Every time a car passes the start line, a car-mounted RF location tag 202 senses the signal from the proximity interrogator and is triggered to transmit a tag signal indicating that a lap has been completed. As another example, a proximity interrogator 223 could be placed at a Gatorade cooler. Each time a player or other participant fills a cup from the cooler a participant-mounted RF location tag 202 senses the signal from the proximity interrogator and is triggered to transmit a tag signal indicating that Gatorade has been consumed. As another example, a proximity interrogator 223 could be placed on a medical cart. When paramedics use the medical cart to pick up a participant (e.g., a player) and move him/her to the locker room, a participant-mounted RF location tag 202 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 3E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 233 is not worn by an individual, it may generate and store a sensor-individual correlator for association with environmental measurements taken in connection with a specific individual. For example, in one embodiment, the diagnostic device 233 may be a blood pressure meter that is configured to store as environmental measurements blood pressure data for various individuals. Each set of environmental measurements (e.g., blood pressure data) may be stored and associated with a sensor-individual correlator.

The depicted diagnostic device 233 is configured to transmit a sensor signal comprising sensor information packets to a sensor receiver 166. The sensor information packets may comprise one or more of the sensor UID, the additional stored data, the environmental measurements, and/or the sensor-individual correlator as discussed above. The sensor receiver 166 may associate some or all of the data from the sensor information packets with other stored data in the sensor receiver 166 or with data stored or received from other sensors, diagnostic devices, RF location tags 102, or reference tags. The sensor receiver 166 transmits a sensor receiver signal to a receiver hub/locate engine 108.

Another type of sensor shown in FIG. 3E/F is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner (also known as a global positioning system (GPS) receiver) receives clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements.

In another embodiment, a triangulation positioner comprises one or more cameras or image-analyzers that receive emitted or reflected light or heat, and then analyzes the received images to determine the location of an individual or sensor. Although a triangulation positioner may transmit data wirelessly, it is not a RF location tag because it does not transmit blink data or a tag signal that can be used by a receiver hub/locate engine 108 to calculate location. In contrast, a triangulation positioner senses position and computes a position calculation that may then be used as environmental measurements by the receiver hub/locate engine 108.

In one embodiment, a triangulation positioner could be combined with a RF location tag or reference tag (not shown). In such embodiments, the triangulation positioner could compute and transmit its position calculation via the RF location tag to one or more receivers. However, the receiver hub/locate engine would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E is a proximity detector 253. A "proximity detector" is a type of sensor that senses identity within an area (e.g., a local area) that is small with respect to the monitored area 100 of FIG. 1. Many different ways of sensing identity (e.g., a unique ID or other identifier for a sensed object or individual) would be apparent to one of ordinary skill in the art in view of this disclosure including, without limitation, reading a linear bar code, reading a two-dimensional bar code, reading a near field communication (NFC) tag, reading a RFID tag such as a UHF tag, HF tag, or low frequency tag, an optical character recognition device, a biometric scanner, or a facial recognition system.

In some embodiments, a proximity detector senses an attribute of an individual (or an individual's wristband, tag, label, card, badge, clothing, uniform, costume, phone, ticket, etc.). The identity sensed by a proximity detector may be stored locally at the proximity detector 253 as shown and transmitted as environmental measurements via one or more sensor information packets to a sensor receiver 166.

In some embodiments, a proximity detector 253 may have a defined position, which is often stationary, and may be associated with a location in the monitored area 100 of FIG. 1. For example, a proximity detector 253 could be located at a finish line of a race track, an entrance gate of a stadium, with a diagnostic device, at a goal line or goal post of a football field, at a base or home plate of a baseball diamond, or a similar fixed location. In such embodiments where the proximity detector is stationary, the position coordinates of the proximity detector and a sensor UID could be stored to a monitored area database (not shown) that is accessible by one or more of the receivers 106, 166, the receiver hub/locate engine 108, and/or other components of the receiver processing and analytics system 110. In embodiments where the proximity detector is movable, a position calculation could be determined with a triangulation positioner, or the proximity detector could be combined with a RF location tag and located by the receiver hub/locate engine 108. While shown as separate fields for illustration purposes in FIG. 3E/F, identify information and position calculation could comprise part of the additional stored sensor data, the environmental measurements, or both.

In one embodiment, the proximity detector could be associated with a reference tag (e.g., tag 104 of FIG. 1) whose position is recorded in the monitored area database. In other embodiments, the proximity detector is movable, such that it may be transported to where it is needed. For example, a proximity detector 253 could be located on a medical cart, first down marker, a diagnostic device, goal post, or carried by a paramedic or security guard. In an embodiment where the proximity detector 253 is movable it would typically be associated with a RF location tag or triangulation positioner so that location (for a RF location tag) or position (for a triangulation positioner) can be determined at the time identity is sensed.

In the embodiment where the proximity detector includes a RF location tag, the receiver hub/locate engine 108 would locate the associated RF location tag, and the tag data/sensor data filter would associate the tag location data for the associated RF location tag as the position of the proximity detector, while determining the identity of an associated individual from any received sensor information packets. In the alternate embodiment where the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 3E is a proximity label 263. A proximity label has a fixed position and an identification code (e.g., a sensor UID). The proximity label 263 may further comprise additional stored sensor data as shown. The depicted proximity label 263 is configured to be read by proximity detector 253. In some embodiments, proximity detector 253 may be further configured to write information to proximity label 263.

A proximity label 263 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 263 are stored such that they are accessible to the receive hub/locate engine 108. For example, in one embodiment, the position coordinates of a proximity label 263 could be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 could be encoded into a passive RFID tag that is placed in that position. As another example, the coordinates of a position of the proximity label 263 could be encoded into a printed barcode that is placed in that position. As another example, a proximity label 263 comprising a NFC tag could be encoded with the location "end zone", and the NFC tag could be placed at or near an end zone at Bank of America stadium. In some embodiments, the stored coordinates of the proximity label 263 may be offset from the actual coordinates of the proximity label 263 by a known or determinable amount.

In one embodiment, a proximity label 263 such as an NFC tag may be encoded with a position. When a sensor such as a proximity detector approaches the NFC tag it may read the position, then transmit the position in a sensor information packet to the sensor receiver 166' and eventually to the receiver hub/locate engine 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 166' and eventually to the receiver hub/locate engine 106 as part of one or more sensor information packets.

In the depicted embodiment, triangulation positioner 243 and proximity detector 253 are each configured to transmit sensor signals carrying sensor information packets to sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, I²C, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 243 and the proximity detector 253, the sensor receiver 166' may associate some or all of the data from the received sensor information packets with other data stored to the sensor receiver 166', or with data stored or received from other sensors (e.g., sensor 203), diagnostic devices 233, RF location tags 102, or RF reference tags 104. Such associated data is referred to herein as "associated sensor data". In the depicted embodiment, the sensor receiver 166' is configured to transmit some or all of the received sensor information packets and any associated sensor data to the receiver hub/locate engine 108 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub/locate engine 108. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub/locate engine 108. In another embodiment, the sensor receiver could determine a first time measurement associated with the first sensor information packet and a second time measurement associated with the second sensor information packet that, in conjunction with the sensor UID, could be used, by the receiver hub/locate engine 108, to associate the first sensor information packet with the second sensor information packet.

In one embodiment, the receiver hub/locate engine 108 receives receiver signals from the receiver 106 and sensor receiver signals from the sensor receivers 166, 166'. In the depicted embodiment, receiver 106 may receive blink data from the RF location tag 102 and transmits to the receiver hub/locate engine 108 some or all of the blink data, perhaps with additional time measurements or signal measurements. In some embodiments, time measurements or signal measurements may be based on a tag signal received from a RF reference tag (e.g., reference tag 104 of FIG. 1). The receiver hub/locate engine 108 collects the blink data, time measurements (e.g., time of arrival, time difference of arrival, phase), and/or signal measurements (e.g., signal strength, signal direction, signal polarization, signal phase) from the receivers 106 and computes tag location data for the tags 102 as discussed above in connection with FIG. 1. In some embodiments, the receivers 106 may be configured with appropriate RF filters, such as to filter out potentially interfering signals or reflections proximate the field of play or other area to be monitored.

The receiver hub/locate engine 108 may also access stored data or clock data from local storage and from a network location. The receiver hub/locate engine 108 uses this information to determine tag location data for each RF location tag. It may also associate data derived or extracted from tag signals transmitted from one or more RF location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub/locate engine 108. Any RTLS system using RF location tags, including those described herein, could require considerable processing by the receiver hub/locate engine 108 to determine the tag location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

FIG. 3F illustrates the example communication structure between RF location tags and sensors including tag 202, origin node sensor 203a, mesh node sensor 203b, receiver 106 and sensor receiver 166 and receiver hub locate engine 108. Sensor nodes 203a and 203b may transmit sensor data between nodes and the tag using Wi-Fi, BLE, NFC, or the like. The origin node 203a may transmit sensor UID, a tag-sensor correlator, sensor metadata and/or origin node data to a tag 202 (not shown). In an instance in which the origin node sends sensor data to the tag 202, the sensor data is transmitted as a portion of the blink data packet. Tag blink data packets are received by the receiver 106. The origin node may transmit an origin node UID, origin node sensor information packets, and/or a origin node tag-sensor correlator to the mesh node 203b or to the sensor receiver 166. If received by a mesh node 203b the mesh node may transmit to another mesh node until the messages are received by sensor receiver 166 or send directly to the sensor receiver. A mesh node 202b may transmit mesh node UID, mesh node sensor information packets, mesh node sensor tag correlator to a second mesh node as an origin node, or directly to the sensor receiver 166. The receiver hub 108 receives tag data and sensor data from the tag 202, mesh node 202b, and/or origin node 202a from the receiver 106 and sensor receiver 166. The receiver hub 108 may associate sensor data with the tag UID location and/or time.

In one embodiment, the receiver hub/locate engine 108 may parse sensor information packets from received tag blink data packets and associate such sensor information packets with the RF location tag 202 that transmitted the sensor information packet. Thus, the receiver hub/locate engine 108 may be able to determine tag location data, which may comprise a location and other data (e.g., tag data, tag UID, tag-individual correlator, sensor-individual correlator, additional stored sensor data, environmental measurements (e.g., audio data), tag-sensor correlator, identity information, position calculation, etc.) from one or more tags or sensors. Such data and information may be transmitted to the receiver processing and analytics system 110.

In some embodiments, once the receiver hub/locate engine 108 determines a location estimate of a RF location tag 102 at the time epoch of the tag signal, the receiver hub/locate engine 108 can also associate a location estimate with the tag blink data packet included in the blink data of such tag signal. In some embodiments, the location estimate of the tag signal may be used as tag location data for the tag blink data packet. In some embodiments a Geographical Information System (GIS) may be used by the receive hub/locate engine 108 to refine a location estimate, or to map a location estimate in one coordinate system to a location estimate in a different coordinate system, to provide a location estimate for the tag blink data packet.

In one embodiment, the location estimated for the tag blink data packet may be associated with any data in the tag blink data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub/locate engine 108 could parse the position calculation and use it to refine a location estimate for the tag blink data packet.

Preferably, the receiver hub/locate engine 108 may access an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some embodiments, by comparing data accessed using a sensor-individual correlator, the receiver hub/locate engine 108 may associate an individual with a sensor information packet received from a sensor, and/or may associate an individual with such sensor. Because the receiver hub/locate engine 108 may associate a sensor position estimate with a sensor information packet, the receiver hub/locate engine 108 may also estimate an individual position for the associated individual.

In another embodiment, by comparing data accessed using a tag-sensor correlator, the receiver hub/locate engine 108 may associate a sensor with a tag blink data packet received from a RF location tag 102. Because the receiver hub/locate engine 108 may associate a location estimate with a tag blink data packet, the receiver hub/locate engine 108 may also create a sensor location estimate for the associated sensor. By comparing a location estimate for a RF location tag with a sensor location estimate or a sensor position estimate, the receiver hub/locate engine 108 may associate a RF location tag with a sensor, or may associate a tag blink data packet with a sensor information packet. The receiver hub/locate engine 108 could also determine a new or refined tag-sensor correlator based on this association.

In still another embodiment, by comparing a location estimate for a RF location tag with an individual location estimate or an individual position estimate, the receiver hub/locate engine 108 may associate a RF location tag with an individual, or may associate a tag blink data packet with an individual. The receiver hub/locate engine 108 could also determine a new or refined tag-individual correlator based on this association.

In one embodiment, by comparing a location estimate for a sensor with an individual location estimate or an individual position estimate, the receiver hub/locate engine 108 may associate a sensor with an individual, or may associate a sensor information packet with an individual. The receiver hub/locate engine 108 could also determine a new or refined sensor-individual correlator based on this association.

Data derived or extracted from tag signals transmitted from one or more RF location tags is referred to herein as "tag derived data" and shall include, without limitation, tag data, tag UID, tag-individual correlator, tag-sensor correlator, tag blink data packets, blink data, time measurements (e.g. time of arrival, time difference of arrival, phase), signal measurements (e.g., signal strength, signal direction, signal polarization, signal phase) and tag location data (e.g., including tag location estimates). Tag derived data is not derived by the RF location tag, but rather, is derived from information transmitted by the RF location tag. Information or data derived or extracted from sensor signals transmitted from one or more sensors is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data. Information or data derived or extracted from audio sensor signals transmitted by one or more audio sensors is referred to herein as "audio data" and shall include without limitation, audio sensor UID, additional stored audio sensor data, audio sensor-individual correlator, audio sensor information packets, tag-audio sensor correlator, and associated audio sensor data. Data derived or extracted from stored individual data is referred to herein as "individual profile information", "participant profile information", or simply "profile information" and shall include, without limitation tag-individual correlator, sensor-individual correlator, identity information, name, uniform number and team, biometric data, tag position on individual. In various embodiments, the receiver hub/locate engine 108 may transmit tag derived data, sensor derived data, individual profile information, various combinations thereof, and/or any information from the GIS, the field database, the monitored area database, and the individual database to the receiver processing and analytics system 110.

Exemplary Location System Transmitting Sensor Data within the UWB Framework

Figure 4:
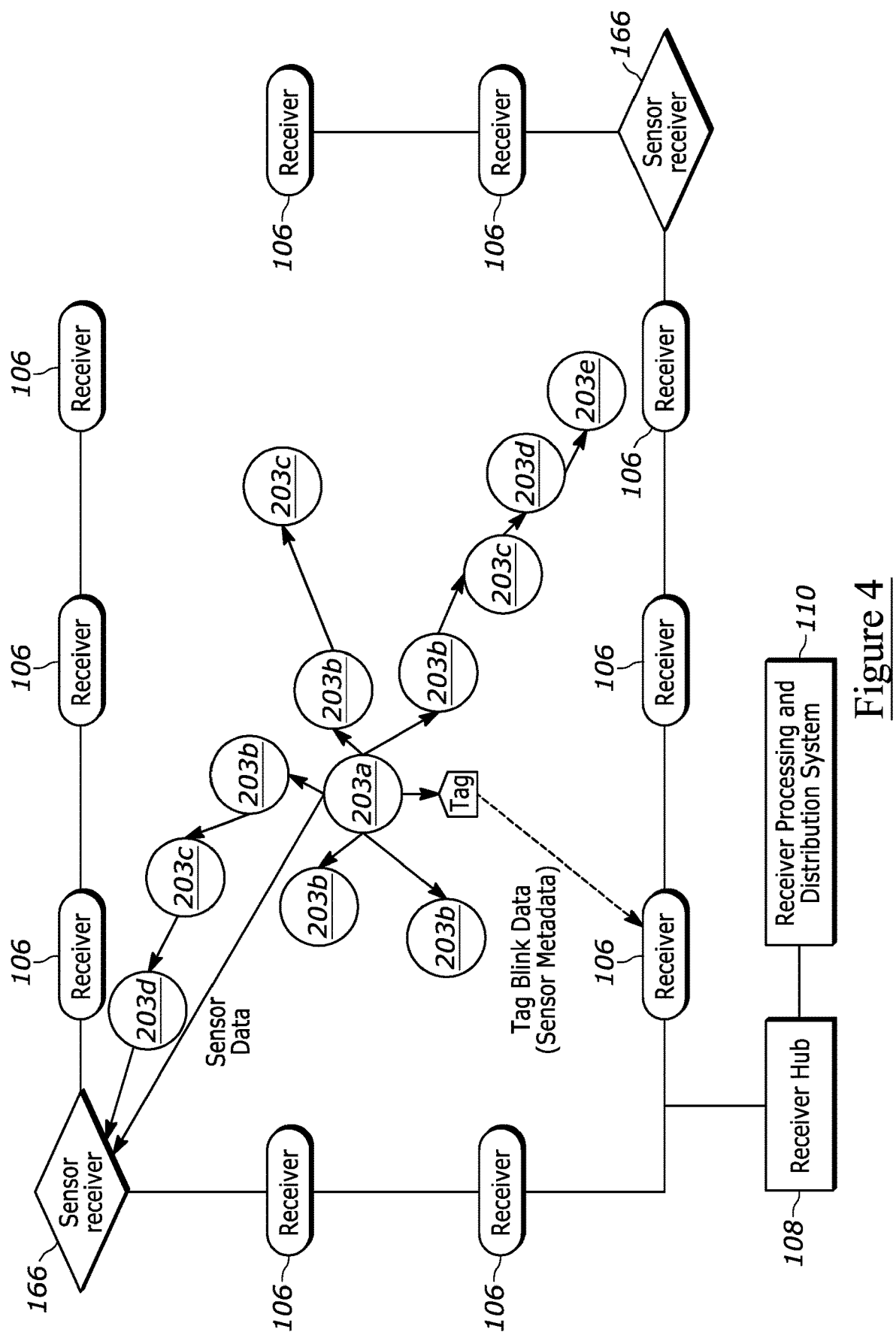
FIG. 4 illustrates a diagram of a location system transmitting sensor data within the UWB framework in accordance with some example embodiments of the present invention.

FIG. 4 illustrates a diagram of a location system transmitting sensor data within the UWB framework. The location system may include sensor or sensor nodes 203*a-e*, receiver 106, sensor receiver 166, a receiver hub 108, and a receiver processing distribution system 110. Any sensor or node 203*a-e* may be associated with a tag (e.g. tag 102 not shown), tag 102 may transmit blink data as described above in FIG. 1. In addition, tag 102 may transmit a sensor data or a portion of sensor data or sensor metadata as a part of the tag blink data packet UWB data payload. Sensor data as discussed above may include video, audio, heart rate, temperature, position, proximity, acceleration, or the like. For example, the sensor 203 may be a compression shirt worn by a participant to monitor heart rate or body temperature. In another example, the sensor 203 is a camera or microphone to monitor audio and visual data from the participant's perspective. Example sensors and associated sensor data are disclosed in Provisional Patent Application No. 61/831,990 filed Jun. 6, 2013 and U.S. patent application Ser. No. 13/942,316 filed Jul. 15, 2013, the contents of each are incorporated by reference in their entirety herein. Several examples of sensors and associated sensor data are provided herein for the purposes of illustration. One skilled in the art would recognized there are other examples of sensors and associated sensor data that may be processed in accordance with embodiments of the invention even though only a few examples are expressly described herein.

In an instance in which the tag transmits (i.e., backhauls or relays) sensor data, the sensor data must be of an appropriate size to be transmitted as a portion of the tag payload, e.g. UWB payload, such as 2, 4, 12, 64 bytes or the like. In some cases the tag payload can be made larger, but there are several restrictions that may prevent enlarging the tag data payload, such as regulatory compliance or to avoid reducing performance of the tag. In cases where the sensor data is larger than the tag data payload can carry, the sensor data could be transmitted in parts across multiple tag data payloads in sequence or could be transmitted via a different communication path such as directly to a Sensor Receiver or indirectly to a Sensor Receiver via a mesh of other sensors (Mesh node sensor Tag UID). The UWB payload described herein is for illustration purposes, one of ordinary skill in the art would immediately appreciate tag data payloads utilizing other bands, such as microwave.

The sensors 203 may generate sensor data based on environmental measurements. The sensor data may include the environmental measurement sensor data, portions of environmental measurement sensor data, or sensor metadata. Sensor metadata is data identifying (i.e., a flag, pointer, address, etc.) the sensor data. The sensor data may be transmitted with the sensor metadata and/or may be transmitted separately through an alternate method, such as direct backhaul over Wi-Fi or cellular, or through a mesh network (e.g., Zigbee, 802.15.4, or the like).

Figure 6:
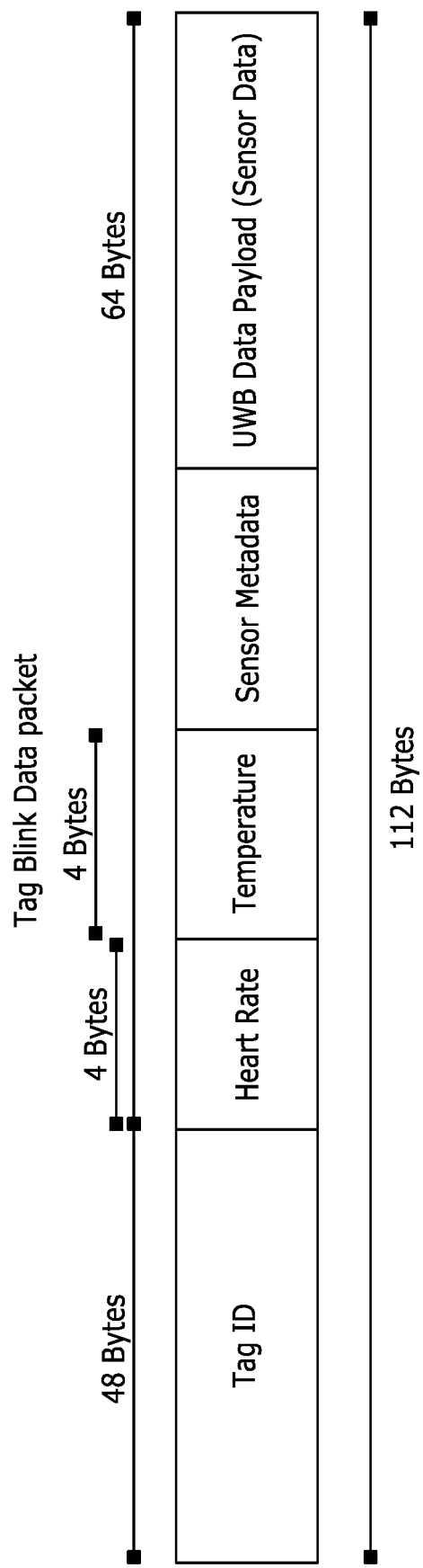
FIG. 6 illustrates an example embodiment of a tag blink data packet in accordance with some example embodiments of the present invention.

In an instance in which the tag transmits sensor metadata, the sensor may associate a sensor data UID with the sensor data. The sensor metadata may comprise the sensor data ID, sensor data characteristics, tag-sensor correlators, or any other data suitable to identify the sensor data at the back-end (e.g., at the receiver processing and distribution system or other host system). The tag 102 receives the sensor metadata and places the sensor data metadata in the tag blink data packet UWB payload as illustrated in FIG. 6. The tag 102 transmits the tag blink data packet as described in FIG. 1 to the receivers 106, which in turn send tag derived data to the receiver hub 108 or receiver processing and distribution system 110. The tag derived data may include tag blink data packets, tag UID, a tag individual correlator, sensor data, sensor data metadata, tag-sensor correlators, or the like. The receiver hub 108 or receiver processing and distribution system 110 may correlate the time associated with the blink data with the sensor data based on the sensor metadata received as a portion of the UWB payload.

Figure 5:
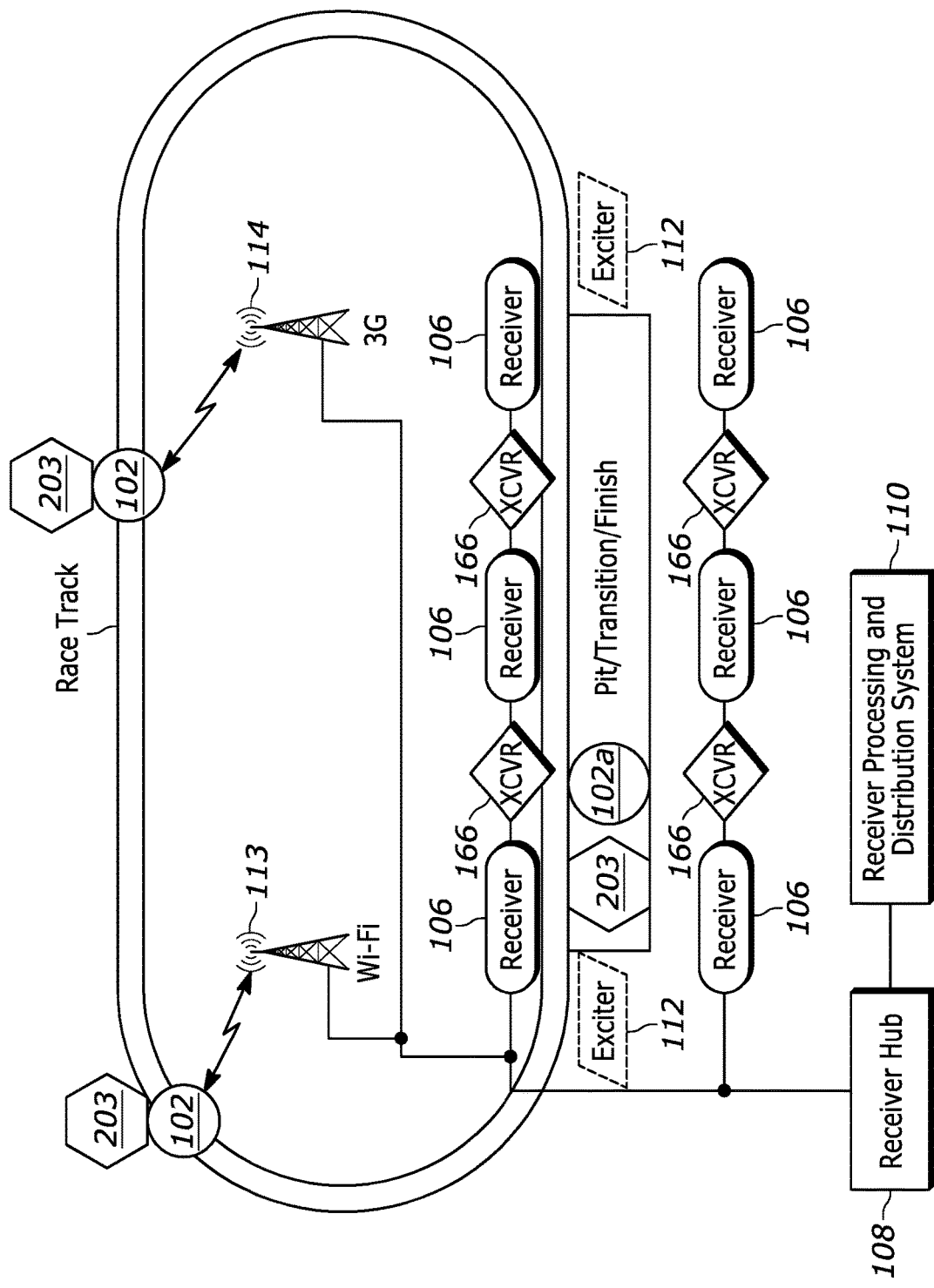
FIG. 5 illustrates a diagram of a location system utilizing multiple sensor data paths in accordance with some of the example embodiments of the present invention.

The sensor 203 may generate sensor data for UWB transmission (i.e., as blink data) by a tag 102 and transmit the sensor data to the tag 102 at a regular interval or upon request. A sensor data request may be the receipt of a transmission reliability signal from exciters 112, as shown in FIG. 5. The transmission reliability signal may be indicative of the sensor and/or associated tag being within the UWB monitored area. In an example embodiment, the sensor receivers 166 are capable of transmitting sensor requests generated by the receiver hub 108 or receiver processing and distribution system 110.

Sensor data may be of small data size to minimize the transmission load of the tag blink data packet such as 4 bytes, 3, bytes, 2 bytes or any other number of bytes that may comply with FCC regulations and allow for the desired transmission distance. For example, a heart rate may be sensed as 80 beats per minute (BPM), 120 BPM, 180 BPM, or the like, a 4 byte sensor data may be generated for these values as 0080, 00120, 0180, or the like. In another example temperature data may be sensed as 98.6 degrees Fahrenheit (F), 101.2 F, 103.2 F, or the like, a 4 byte sensor data may be generated for these values as 0986, 1012, 1032, or the like.

In an example embodiment, the amount of sensor data transmitted may be limited by setting a float value and transmitting the deviation from the float value. For example, a heart rate float value may be set as 80 BPM and a heart rate may be sensed as 96 BPM, a 2 byte sensor data may be generated as 16. In another example, a temperature float value may be set as 95.0 F and a temperature of 102.2 may be sensed, a 2 byte sensor data may be generated as 72.

In an example embodiment, the sensor data transmissions may be limited by setting a threshold value, the sensor may determine if the sensor data satisfies the predetermined threshold by comparing the sensor data to the threshold value and only transmit sensor data when the sensor data satisfies the threshold value. For example, a temperature threshold may be set at 100.0 F, and the temperature sensed may be 99.7, failing to satisfy the threshold and thus not being sent to the tag 102 for transmission. In another example, a heart rate threshold may be set at 160 BPM, if the heart rate sensed is 158 the sensor data will fail to satisfy the threshold and thus may not be sent to the tag for transmission.

In an example embodiment, the sensor data transmissions may be managed or limited by segmenting the sensor data. The sensor 203 may segment the sensor data and associate a sensor data UID with each sensor data segment. The sensor data UID may also be a portion of the sensor metadata packet. For example, a video or audio file may be segmented and associated with a sensor data UID. A sensor data UID identifying each segment and the segment order may be a portion of the sensor metadata, which may be used to sequence the sensor data segments at the receiver hub 108 or receiver processing and distribution system 110.

In an example embodiment, sensors 203*a-e* may transmit sensor data directly to the sensor receivers using Wi-Fi, such as IEEE 802.11, 802.15, or 802.16, cellular signals, such as 3G or 4G, or the like. For example, the sensor 203 may transmit only a sensor metadata packet to the tag for transmission as a portion of the tag blink data and transmit the sensor data to the sensor receivers 166, including a sensor data UID for later association, sequencing, and/or synchronization.

In an example embodiment, the sensors 203*a-e* may transmit sensor data to the sensor receivers 166 through a mesh network using Wi-Fi, BLE, NFC, or the like. In an instance in which the sensor 203 is the origin point of a mesh network transmission of sensor data the sensor may be referred to as an origin node. In an instance in which the sensor receives or transmits sensor data of an origin node, the sensor may be referred to as a mesh node. The sensor data transmitted through a mesh network may be referred to as a sensor data message.

In an example embodiment, an origin node may transmit sensor data or a portion of sensor data to one or more sensor receivers over a Wi-Fi, such as IEEE 802.11, 802.15, or 802.16, BLE, NFC, or the like. Sensor metadata may be transmitted as a portion of the blink data UWB data payload that is received by the receiver 106 and transmitted to the receiver hub 108. While sensor transmissions are intended for sensor receivers, for the reasons discussed above, an origin node 203*a* may first transmit the sensor data message to mesh nodes 203*b*. The mesh nodes 203*b* may transmit the sensor data message to other mesh nodes 203*c*-203*e* or may transmit directly to the sensor receiver(s) 166. For example, the origin node 203*a* may transmit sensor data message to mesh nodes 203*b*, mesh nodes 203*b* may transmit to mesh nodes 203*c*, mesh nodes 203*c* may transmit the sensor data message to mesh nodes 203*d*. Mesh nodes 203*d* may transmit the sensor data to mesh node 203*e* and to then sensor receiver 166.

In an example embodiment, the origin node 203*a* and mesh nodes 203*b-e* may append the sensor UID and/or tag UID to the transmission of sensor data. The sensor UID may be used by the mesh nodes 203*b-e* to determine transmission count as described below. Additionally, a receiver hub 108 will receive the sensor UIDs and a processing and distribution system 110 may use the sensor UIDs for analytics or diagnostics associated with the RTLS and/or mesh network.

In an example embodiment, the duration of relay transmissions of the sensor data message through a mesh network may be limited by a message count. The limitation of message transmission duration prevents the message from circling throughout the mesh network indefinitely or continuing the transmission after the message has been received by the sensor receiver 166. A message count may comprise a number of transmissions from sensor node to sensor node, e.g., transmission count, such as three transmissions, four transmissions, five transmissions or any other number of transmissions. The message count may be a time count such as three seconds, two seconds, one second, half a second, or any other time value. In an instance in which a message count does not satisfy a predetermined threshold, the mesh nodes 203*b-e* may transmit the received origin node 203*a* sensor data message.

In an instance in which the message count satisfies the predetermined threshold, the mesh node 203*b-e* may not transmit receive origin node 203*a* sensor data. For example, origin node 203*a* may transmit sensor data message to a mesh node 203*b*. The mesh nodes 203*b* may transmit the sensor data message to mesh nodes 203*b* through 203*d*. In an instance in which the message count threshold is four transmissions, mesh node 203*d* is the last transmission of the sensor data message. The sensor data message may be received by the sensor receiver 166, which sends the sensor data message to the receiver hub 108 for processing, or may be received by another mesh node 203*e*. The message count threshold is satisfied in an instance in which the mesh node 203*e* receives the sensor data message and the mesh node disregards the sensor data message terminating a particular message route through the sensor network.

The receiver hub 108 or receiver processing distribution system 110 may receive tag blink data packets and/or sensor data from the receivers 106 and sensor receivers 166. The receiver hub 108 or receiver processing and distribution system 110 may calculate location data based on the blink data as discussed in FIG. 1 and calculate a time data associated with the tag blink data packet. Time data may be the reference clock time associated with the receipt of the tag blink data. In an instance in which the tag blink data packet comprises sensor data, the receiver hub 108 or receiver processing and distribution system 110 may associate the calculated location data and/or time data to the sensor data based on the sensor data's transmission as a portion of the tag blink data packet. Additionally, the tag blink data may comprise sensor metadata. The receiver hub 108 or the receiver processing and distribution system 110 may sequence the sensor data based on the sensor data UID of the sensor metadata. For example, if the received sensor data contains 5 segments, the sensor metadata sensor data UID may be used to identify and sequence the 5 segments in the correct order.

In an example embodiment in which the tag blink data packet comprises sensor metadata packet, the receiver hub 108 or receiver processing and distribution system 110 may associate the sensor data with the location data and/or time data by comparing the sensor data UID or other sensor data identifiers of the sensor data to the sensor data UID or identifiers of the sensor metadata packet. The receiver hub 108 or receiver processing and distribution system 110 may associate matching sensor data UIDs or identifiers. Additionally, the receiver hub 108 or receiver processing and distribution system 110 may sequence the sensor data based on the sensor data UID as described above. For example, if a sensor metadata is received with a sensor data UID of 113563, the receiver hub 108 or receiver processing and distribution system may identify and associate location and/or time data of the tag blink data with received sensor data with a sensor data UID of 113563.

The receiver hub 108 or receiver processing and distribution system 110 may synchronize the tag location or time data with the sensor data, based on the association discussed above. The receiver hub 108 or receiver processing and distribution system 110 may make time notations (e.g., timestamps) in the sensor data for synchronization of playback, or create a combined location and sensor data.

The receiver hub 108 or receiver processing and distribution system 110 may receive an indication of selected sensor data. The receiver hub 108 or receiver processing and distribution system 110 may cause the selected sensor data to be displayed on a user interface. The sensor data may be displayed by itself, with other sensor data, or location data.

For example, participant heart rate and temperature may be selected. The receiver hub 108 or receiver processing and distribution system may display the participant location with an overlay or breakout of heart rate and/or temperature. In another example, the sensor data may be audio or video data. The receiver hub 108 or receiver processing and distribution system 110 may display the participant location data with the audio or video data in a breakout or image overlay.

Example Location System with Utilizing Multiple Sensor Data Paths

FIG. 5 illustrates a diagram of a location system utilizing multiple sensor data paths. Location system including tags 102 and 102A, sensors 203, receivers 106, sensor receiver 166, receiver hub 108, receiver processing distribution system 110, exciters 112, Wi-Fi antenna 113 and a cellular (3G or 4G) antenna 114. In the event location such as a racetrack, marathon course, triathlon course, cross-country field, bicycle course, or the like, a single sensor data path may not be suitable to deliver accurate and timely data information. A location system may utilize multiple sensor data paths to deliver the type of information desired at different areas of the monitored environment. For example, tags on the track, on the field, worn by participants running the marathon or otherwise participating in the event, or the like may transmit non-time or location critical sensor data to a sensor receiver such as a Wi-Fi antenna 113 or a 3G antenna 114. Examples of non-time critical or location critical sensor data may include battery voltage, fuel tank level, gear, tire temperature, or the like. Time or location critical data may be recorded for transmission in other areas of the event with UWB coverage. For example, the pit areas of a racetrack, a transition point of a triathlon, marathon, cross-country event, bicycling event or the finish line of any race may utilize UWB location and sensor data transmission for generating accurate time and location data to be associated with any transmitted sensor data.

In some embodiments, a tag 102a or sensor 203 may receive a transmission reliability signal from one or more exciters 112. An exciter 112 may be one or more low frequency transceivers, which transmit a short range low frequency signal for example 12 inches, 18 inches 36 inches, or the like. Exciters 112 may be mounted on the ground at a boundary to a monitored area, or mounted to a ring through which participants must go through to enter a monitored area. In another embodiment, an exciter 112 may be a Bluetooth beacon device which emits a Bluetooth beacon signal, such that the processing module 700 of a tag or sensor receiving said Bluetooth beacon signal may interpret the signal as a transmission reliability signal, The receipt of the transmission reliability signal by the tag 102a or sensor 203 indicates that the tag is within the UWB monitored area. The tag 102a may change UWB blink rate or commence or terminate transmitting blink data based on receipt of the transmission reliability signal. The sensor may transmit sensor data or a portion of sensor data in a tag blink data packet UWB data payload as discussed in FIG. 4. The tag 102a in the event area such as the pits, transition areas, and finish line may require a high level of location accuracy and associated sensor data for a participant analytics, determination of winners, or the like. Additionally, the transmission of tag blink data including sensor metadata in monitored areas allows for the sensor data to have time data and location data associated for synchronization purposes. In an example embodiment the sensor 203 may determine the method of transmission of sensor data based on the receipt of the transmission reliability signal. For example, in an instance in which the sensor 203 has received the transmission reliability signal, the sensor may transmit the sensor data directly to the sensor receiver 166, potentially by transmitting at a higher power, a higher rate, a different packet size, a different communication channel, or within a particular radio frequency band. In an instance in which the sensor 203 has not received the transmission reliability signal, the sensor may transmit the sensor data through a mesh network as discussed in FIG. 4.

Exemplary Tag Blink Data Packet

FIG. 6 illustrates an example embodiment of a tag blink data packet. The tag blink data packet may comprise 56 bytes, 64 bytes, 72 bytes, 112 bytes, or any other number of bytes. The UWB payload may be limited by output due to FCC regulations such as 47 CFR 15.517 and 47 CFR 15.519, which limit the effective isotropical radiated power and the average resolution bandwidth. An increase in data throughput may require an increase in transmission time and therefore a decrease in peak power to maintain the average resolution bandwidth below the requirements of the FCC regulations. Since there is a direct tradeoff between the amount of data sent over a UWB device and the peak power the UWB device is allowed to broadcast, there is also a tradeoff between the amount of data sent and the maximum distance at which that data can be received by a receiver or a sensor receiver.

Tag blink data packet may comprise a tag ID and a UWB data payload. The tag ID may consist of any number of bytes necessary to identify a specific tag, for example, 12, 24, or 48 bytes. The UWB data payload may comprise any remaining bytes of the tag blink data packet, for example, 24, 48, or 64 bytes. Packets comprising sensor data, portions of sensor data, and/or sensor metadata may be placed in the UWB data payload. For example, a heart rate or a temperature of participant sensor data may be placed in the UWB data payload or sensor metadata identifying sensor data transmitted separately from the UWB data payload. In an example embodiment, the sensor metadata may include a sensor data UID associated with sensor data transmitted as a portion of the tag blink data packet separately for later identification, sequencing, or synchronization by the receiver hub 108 or receiver processing and distribution system 110.

In an example embodiment, the heart rate sensor data may be a specified number of digits, for example, 4 digits, 2 digits, or any other number of digits. In an example embodiment when the heart rate sensor data is a 4-digit value and the sensed heart rate is 80, 120, 160, or 180 BPM, the sensor data may be 0080, 0120, 0160, 0180 or any other heart rate sensor data value.

In an example embodiment in which the heart rate sensor data is a 2-digit value, the sensor may set a float value such as 80 BPM. The sensor data heart rate may be the difference between the float value and the received heart rate sensor data value. For example, when a float value is 80 and the sensor data heart rate is 120 BPM, the heart rate sensor data value would be 40. In an example embodiment, sensor data may comprise temperature data of a predetermined digit value such as 4 digits, 2 digits, or any other number of digits.

In example embodiment in which the temperature sensor data is 4 digits and the sensed temperature data is 98.6 F or 102.4 F, temperature may be recorded as 0986, 1024 or any other 4-digit temperature value. In an example embodiment in which the temperature value is a 2-digit number, a float value may be set such as 98.6 F, the temperature sensor data value being the sensed temperature value deviation from the float temperature value. For example, when the sensed temperature value is 98.6 F degrees and the sensor temperature value is 100.2 F, the temperature data may be 16.

In an example embodiment the sensor 203 may create sensor metadata to identify a portion of sensor data. The sensor metadata may be a serial number, sensor data characteristics, a time stamp, a flag, a pointer, an address, or any other data to identify the sensor data or portion of sensor data. The sensor metadata may be transmitted as a portion of the UWB data payload of the tag blink data packet.

In an example embodiment, a sensor 203 may segment and associate a sensor data UID to each sensor data segment. Each segmented portion of sensor data may be of a sufficient size to be transmitted as portion of the UWB data payload of the tag blink data packet, such as 64, 52, 24 or any other number of bytes. The receiver hub 108 or receiver processing distribution system 110 may receive the segments of sensor data and associated sensor data UID and sequence the sensor data segments. Additionally, the receiver hub 108 or receiver processing distribution system 110 may use the UWB tag ID location and time data to sequence, associate, and or synchronize the sensor data with the tag location and time data.

The data sizes for each data segment are merely for illustration purposes, one of ordinary skill in the art would immediately appreciate that other data segment sizes may be utilized based on the data to be transmitted.

Example Processing Module

Figure 7:
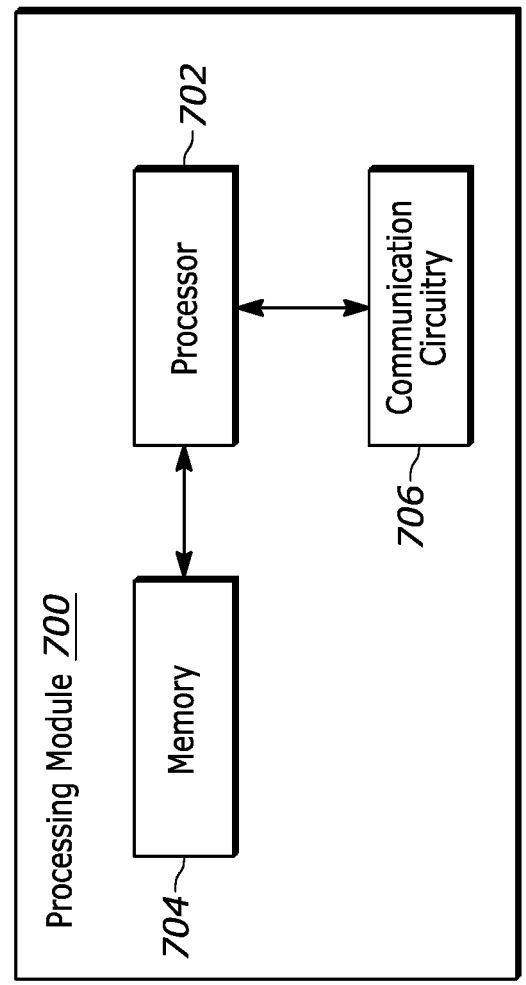

FIG. 7 illustrates a block diagram of components that may be included in a processing module 700, such as a tag 102, sensor 203, or receiver hub 108. The processing module 700 may comprise one or more processors, such as processor 702, one or more memories 704, and communication circuitry 706. Processor 702 can be, for example, a microprocessor that is configured to execute software instructions and/or other types of code portions for carrying out defined steps, some of which are discussed herein. Processor 702 may communicate internally using data bus, for example, which may be used to convey data, including program instructions, between processor 702 and communication circuitry 706.

Memory 704 may include one or more non-transitory storage media such as, for example, volatile and/or non-volatile memory that may be either fixed or removable. Memory 704 may be configured to store information, data, applications, instructions or the like for enabling processing module 700 to carry out various functions in accordance with example embodiments of the present invention. For example, the memory 704 could be configured to buffer input data for processing by processor 702. Additionally or alternatively, the memory 704 could be configured to store instructions for execution by processor 702. Memory 704 can be considered primary memory and be included in, for example, RAM or other forms of volatile storage which retain its contents only during operation, and/or memory 704 may be included in non-volatile storage, such as ROM, EPROM, EEPROM, FLASH, or other types of storage that retain the memory contents independent of the power state of the processing module 700. Memory 704 could also be included in a secondary storage device, such as external disk storage, that stores large amounts of data. In some embodiments, the disk storage may communicate with processor 702 using an input/output component via a data bus or other routing component. The secondary memory may include a hard disk, compact disk, DVD, memory card, or any other type of mass storage type known to those skilled in the art.

In some embodiments, processor 702 may be configured to communicate with external communication networks and devices using communications circuitry 706, and may use a variety of interfaces such as data communication oriented protocols, including X.25, ISDN, DSL, among others. Communications circuitry 706 may also incorporate a modem for interfacing and communicating with a standard telephone line, an Ethernet interface, cable system, and/or any other type of communications system. Additionally, processor 702 may communicate via a wireless interface that is operatively connected to communications circuitry 706 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1× EV-DO, GPRS, W-CDMA, LTE, and/or any other protocol.

Example Tag

Figure 7C:
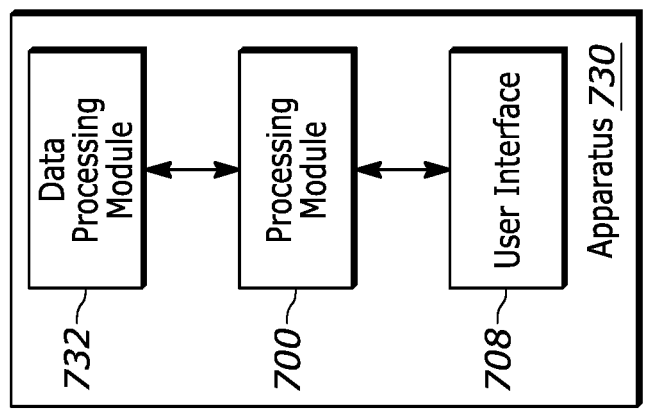
Figure 7B:
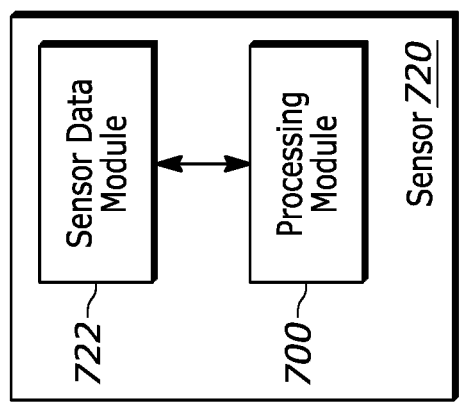
Figure 7A:
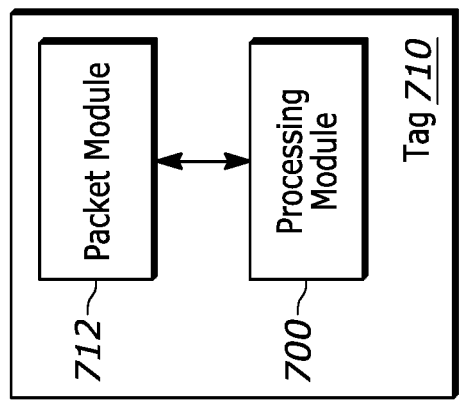

FIG. 7a illustrates a block diagram of components that may be included in a tag 710. The tag 710 may include a processing module 700 and a packet module 712. The packet module 712 may in turn be in communication with the processor 702 of the processing module 700. The packet module 712 may be configured to cause the processor 702 to receive sensor data from at least one sensor, generate tag blink data packets, and cause the communication circuitry 706 to transmit the tag blink data packets. In an example embodiment the packet module 712 may be configured to cause the processor 702 to determine the receipt of a transmission reliability signal and the transmission of tag blink data may be based on the determination of the receipt of the transmission reliability signal.

Example Sensor

FIG. 7b illustrates a block diagram of components that may be included in a sensor 720. The sensor 720 may include a processing module 700 and a sensor data module 722. The sensor data module 722 may in turn be in communication with a processor 702 of the processing module 700. The sensor data module 722 may be configured to cause the processor 702 to associate a sensor with a tag, generate a tag-sensor correlator, generate sensor data, and transmit the sensor data via the communication circuitry 706.

In an example embodiment, the sensor data module may be configured to cause the processing module 700 to receive origin node sensor data, and transmit the origin node sensor data. In an example embodiment, the sensor module 722 may be configured to cause the processor 702 to determine if the origin node sensor data satisfies a predetermined threshold and the transmitting sensor data is based on the determination of the origin node sensor data satisfying the predetermined threshold.

Example Apparatus

FIG. 7C illustrates a block diagram of components that may be included in apparatus 730 such as a receiver hub 108 or a receiver processing distribution system 110 of FIG. 1. The apparatus 730 comprises a processing module 700, a data processing module 732, and a user interface 708.

The user interface 708 may be in communication with the processor 702, of the processing module 700, to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The apparatus may comprise user interface circuitry configured to control at least some functions of one or more user interface elements such as a display and, in some embodiments, a speaker, ringer, microphone and/or the like. The apparatus and/or user interface circuitry comprising the processor may be configured to control one or more functions of one or more user interface elements through computer program instructions (e.g., software and/or firmware) stored on a memory accessible to the processor (e.g., memory 704, and/or the like).

The apparatus 730 may include a data processing module 732 that may in turn be in communication with a processor 702 of the processing module 700 and configured to cause the processor to receive at least one tag blink data packet from a plurality of receivers. The tag blink data packet including a tag identifier and at least a portion of sensor data or sensor metadata, calculate a tag location based on the tag blink data packet, receive an indication of a selected sensor data, and cause the tag location or the selected sensor data to be displayed. The sensor data module 720 may be further configured to cause the processor 702 to sequence the receive portions of sensor data. The sensor data module 732 may be further configured to synchronize tag location data with sensor data. The sensor data module may be further configured to request sensor data and transmit a sensor data request.

FIGS. 8, 9, and 10 illustrate example flowcharts of the operations performed by a tag, such as tag 710 of FIG. 7a, a sensor 720 of FIG. 7b, or an apparatus, such as apparatus 730 of FIG. 7c, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 704 of a processing module employing an embodiment of the present invention and executed by a processor 702 in the processing module. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s).

As such, the operations of FIGS. 8, 9, and 10 when executed, convert a computer or processing circuitry into a particular machine configured to perform an example embodiment of the present invention. Accordingly, the operations of FIGS. 8, 9, and 10 define an algorithm for configuring a computer or processor, to perform an example embodiment. In some cases, a general purpose computer may be provided with an instance of the processor which performs the algorithm of FIGS. 8, 9, and 10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIGS. 8, 9, and 10). It should be appreciated that each of the modifications, optional additions or amplifications described herein may be included with the operations herein either alone or in combination with any others among the features described herein.

Example Sensor Data Transmission Process

FIG. 8 illustrates an exemplary process for generating and transmitting sensor data within the UWB framework. At 822, a sensor such as sensor 720 may include a sensor data module 722 configured to cause the processor 702 to associate a sensor with a tag (e.g., tag 102). The sensor 720 may be in wireless or wired communication with the processing module 700. The processor 702 may associate the sensor 720 with the tag 102 by associating the tag UID and the sensor UID (e.g., a tag-sensor correlator).

At 824, the sensor data module 722 may be configured to cause the processor 702 to generate a tag-sensor correlator. The tag-sensor correlator may comprise the tag UID, the sensor UID, or any other information that would associate the sensor 720 to a specific tag 102.

At 826, the sensor data module 722 may be configured to cause the processor 702 to limit sensor data (i.e., to reduce collisions, communication channel traffic, to preserve tag and/or sensor power, to meet regulatory requirements, etc.) by setting a predetermined threshold for sensor data and determining if the sensor data satisfies the predetermined threshold. Sensor data may comprise without limitation, heart rate, temperature, video, audio, acceleration, or the like. The sensor data is generated at 830 and transmitted at 834 when the processor 702 determines the sensed data satisfies the predetermined threshold. For example if a heart rate threshold is set as 160 BPM and the sensed heart rate is 158 BPM, no sensor data will be transmitted. If the sensed heart rate is 168, a sensor data may be transmitted. At 826, the sensor data module 722 may be configured to cause the processor 702 to generate sensor data. The processor 702 may associate a sensor data UID to the sensor data and generate sensor metadata.

At 827, the sensor data module 722 may be configured to cause the processor 702 to receive a request for sensor data from communications circuitry 706. The sensor data transmission may be limited by generating and transmitting sensor data only when a sensor data request is received. The processor 702 may be configured to generate and transmit the requested sensor data as described below at 830-834. Sensor data requests may be received at a predetermined interval, such as every one second, one minute, two minutes, ten minutes, thirty minutes or any other time value. For example, temperature being the slower to change than heart rate, temperature may be requested every 10 minutes whereas heart rate may be requested every 1 minute.

The processor 702 may receive a sensor data request transmitted by the receiver hub 108 or receiver processing and distribution system based on a selection of sensor data that is not normally sent, for example, an object ball triangulation position.

In an example embodiment the sensor 720 may receive a transmission reliability signal form exciters, such as exciters 112 of FIG. 5. The processor 702 may be configured to consider the transmission reliability signal as a sensor data request. For example, the transmission reliability signal may be indicative of the participant entering a UWB monitored area.

At 828, the sensor data module 722 may be configured to cause the processor 702 to limit the sensor data by setting a float value for the sensor data. The float value may be a value that is below the normal expected range, which the processor 702 may base the generation of sensor data. For example a float value of 98.0 F may be set for temperature or 80 BPM set for heart rate.

At 832, the sensor data module 722 may be configured to cause the processor 702 to generate sensor data. Sensor data may comprise environmental measurements and/or sensor metadata. The sensor data may be the total sensor data information or a portion of the sensor data. Sensor metadata may comprise sensor data UID, characteristics, tag-sensor correlators, or other data used to identify the sensor data for later association, sequencing or synchronization.

In an example embodiment, the sensor data size may be small amounts of data such as 4 bytes, 3 bytes, 2 bytes, or the like. In an example in which the sensor data is heart rate data, the sensor data for heart rates of 80, 120, and 180 BPM may be generated in 4 bytes as 0080, 0120, 0180 or the like. In an embodiment in which the sensor data is temperature data the sensor data for temperatures of 98.5, 100.2 and 103.1 may be generated in 4 bytes as 0985, 1002, 1031 or the like.

In an example embodiment in which a float value has been set, the processor 702 may limit the generated sensor data by generating sensor data as the deviation of the sensed data from the float value. For example, if a temperature float value of 98.6 F has been set and the temperature data is sensed as 100.2 F, the sensor data may be generated by the processor 702 may be a 2 byte value of 16. In another example where a heart rate float value has been set as 80 BPM and the sensed heart rate is 120 BPM, the heart rate sensor data generated by the processor 702 may be a 2 byte value of 40.

At 832, the sensor data module 722 may be configured to cause the processor 702 to segment sensor data. Segmentation of sensor data may be desired in an instance in which the sensor data is too large to be transmitted over UWB as a portion of the tag blink data packet. For example, the sensor data comprises greater than 48 bytes, 64 bytes or any other number of bytes that may comprise the UWB data payload of the tag blink data packet. The processor 702 may segment the sensor data and associate sensor data UIDs to each of the sensor data segments. Additionally, the processor may append the sensor data UID as at least a portion of the sensor metadata. For example the sensor data segment may have a sensor data UID of 11635, and the sensor metadata may include the segment serialization 11635.

In an example embodiment, the sensor data may be a video or audio data the sensor data transmission size may be limited by segmentation of the sensor data into smaller sensor data segments such as 24 bytes, 48 bytes, 64 bytes or the like and associate sensor data UIDs to each segment.

At 833, the sensor module 720 may be configured to cause the processor 702 to determine the receipt of a transmission reliability signal from the communications circuitry 706. The communications circuitry may receive the transmission reliability signal from the sensor receiver 166 or exciters 112 as discussed in FIG. 5.

At 834, the sensor module 720 may be configured to cause the processor 702 to cause the communication circuitry 706 to transmit sensor data. The communication circuitry 706 may transmit sensor data comprising, sensor data, sensor metadata, tag-sensor correlators, or the like. The communication circuitry 706 may transmit sensor data to a sensor receiver 166 such as a Wi-Fi antenna 113 or cellular antenna 114 as depicted in FIG. 5. Additionally, sensor data or sensor metadata may be transmitted to tags 102. In an example embodiment the sensor data may be transmitted to the sensor receiver through a mesh network using Wi-Fi, NFC, BLE, or the like.

In an example embodiment, the processor 702 may determine the transmission path of the sensor data, e.g. directly to the sensor receiver 166 or through a mesh network based on the determination of receipt of the transmission reliability signal at 833. In an instance in which the processor 702 determines the transmission reliability signal has not been received, the processor may cause the communication circuitry 706 to transmit the sensor data though the mesh network. In an instance in which the processor 702 determines that the transmission reliability signal has been received, the processor may cause the communication circuitry to transmit the sensor data directly to the sensor receiver 166.

In an instance in which the sensor is the origin of a sensor data message transmission, the sensor is referred to as an origin node. In an instance in which the sensor receives or receives and transmits the origin node sensor data message, the sensor is referred to as a mesh node. The origin node and/or mesh nodes may append the sensor UID to the sensor data transmission for determination of a transmission count, discussed below, or for later analysis and diagnostics.

At 835, the sensor data module 722 may be configured to cause the processor 702 to receive an origin node sensor data message from the communication circuitry 706. The communication circuitry may receive the origin node sensor data message form an origin node or mesh node. For example, the origin node may be sensor 203a of FIG. 4 and the mesh node receiving the origin node sensor data message may be sensors 203b-203e.

At 836, the sensor data module 722 may be configured to limit the transmission of sensor data messages by determining if the sensor data message satisfies a predetermined threshold or message count. The sensor data module 722 may cause the processor 702 to limit the transmissions that prevent a message from being perpetually transmitted throughout the monitored area. A message count may include a transmission count, such as 3, 4, or 5 transmissions or time counts, such as 3, 2 or 1 second. The number of transmissions may be determined by incremental count in the message data or by the number of sensor or tag UIDs that have been appended to the message data at 838 or 832. If the processor 702 determines the message count satisfies the predetermined threshold, the sensor data module 722 may cause the processor to terminate sensor data message at 840. In an instance in which the message count fails to satisfy the threshold, the processor 702 may cause the communication circuitry 706 to transmit the origin node sensor data message as discussed at 838. The threshold may vary based on the environmental measurements, such as a temperature above 100 may have a threshold of 6 transmissions or 4 seconds while a temperature below 100 may have a threshold of 2 transmissions or 1 second. The threshold may also vary based on the attributes of the nodes, such as a threshold of 3 transmissions if they are sensors associated with different participants, or 7 transmissions total.

For example, origin node 203*a* may transmit a sensor data message to a mesh node 203*b*. The mesh nodes 203*b* may transmit the sensor data message to mesh nodes 203*c* through 203*e*. In an instance in which the message count threshold is four transmissions, mesh node 203*d* is the last transmission of the sensor data message. The message may be received by the sensor receiver 166, which sends a message to the receiver hub 108 for processing. The message may be received by another mesh node 203*e*; the message count threshold is satisfied in an instance in which the mesh node 203*e* receives the sensor data, so the mesh node disregards the sensor data, terminating the sensor data message route.

At 838, the sensor data module 722 may be configured to cause the processor 702 to cause the communication circuitry to transmit the origin node sensor data message. The processor 702 may append the mesh node sensor UID to the sensor data for further transmission count determinations, or analytics and diagnostics of the mesh network. The sensor message may be transmitted by communication circuitry 706 or the like.

At 840, the sensor data module may be configured to cause the processor 702 to terminate the sensor data message. The sensor data message may be terminated by not causing further transmission of the sensor data message. In some embodiments, information about the terminated sensor data message may be logged in memory 704.

Example Tag Blink Data Packet Transmission Process

FIG. 9 illustrates a flow chart of an exemplary process for transmitting tag blink data including sensor data within an UWB framework. At 904, tag 710 comprising a processing module 700 and a packet module 712 may be provided. At 904, the packet module 712 may be configured to cause a processor 702 to receive sensor data from communication circuitry 706. Communication circuitry 706 may receive sensor data packet from sensor 203 of FIG. 4. Sensor data packet may include the sensor data itself being audio, visual, temperature, heart rate, or the like being transmitted as a portion of the sensor data packet, and/or may include sensor metadata identifying a sensor data that is being transmitted separately from the sensor data packet. Sensor data may be complete or may be received as sensor data segments associated with a sensor data UID. The sensor metadata may include the sensor data UID. Sensor data may be received by a communication circuitry 706 in response to a sensor determination of sensor data exceeding a threshold, in response to the sensor data request, or at a predetermined interval, or other transmission occurrences. Example embodiments of the sensor data and sensor metadata are provided in the discussion of FIG. 8.

At 906, the packet module 712 may be configured to cause the processor 702 to generate tag blink data packets. Tag blink data packets may comprise tag UID, tag individual correlators, tag-sensor correlators, sensor data, sensor data metadata, or the like. The tag blink data packet size may be 1, 12, 48, 64, 112 bytes, or any other number of bytes that is sufficient to transmit data, have the desired effective range, and be in compliance with the applicable communications regulations.

The processor 702 may generate a tag blink data packet comprising the tag UID and any combination of sensor data, sensor metadata, or other data. For example, the tag blink data packet may include a 48 byte tag UID, a 4 byte heart rate sensor data, a 4 byte temperature sensor data, a 4 byte sensor metadata, and a 52 bytes of other sensor data as depicted in FIG. 6. The sensor metadata may identify the sensor data sent as a portion of the tag blink data, or a sensor data which was transmitted to a sensor receiver 166 directly or through a mesh network. The sensor data may be a segment of a total sensor data. In an instance in which the sensor data is a segment of the total sensor data, the sensor metadata and sensor data segment may include a sensor data UID.

At 907, the packet module 712 may be configured to cause the processor 702 to receive a transmission reliability signal from communication circuitry 706. The communication circuitry may receive transmission reliability signals from exciters, such as exciter 112 of FIG. 5.

At 908, the packet module 712 may cause the processor 702 to cause the transmission of tag blink data packets by the communication circuitry 706. The transmission of tag blink data packets is substantially similar to the transmission of tag blink data packets as discussed in FIG. 1.

In an example embodiment, the packet module 712 may cause the processor 702 to determine the blink rate based on the receipt of a transmission reliability signal. The transmission reliability signal may be indicative of the tag 710 being within a UWB monitored area. The processor 702 may increase or decrease the blink rate based on the transmission reliability signal, or, commence or terminate transmitting tag blink data. Transmission of tag blink data based on the receipt of a transmission reliability signal may increase battery life and limit missed sensor data by reducing tag blink transmissions during time periods or from regions where the tag blink data may not be received. For example, the processor that may cause transmission at a low blink rate such as 1 HZ when no transmission reliability signal is received may increase blink rate to 72 Hz when the transmission reliability signal is received at 907. In another example, the processor 702 may commence transmission of blink data when the transmission reliability signal is received and terminate the transmission of blink data when the transmission reliability signal is not received.

Example Location/Position Determination Process

FIG. 10 illustrates an exemplary process for displaying tag location and selected sensor data. An apparatus 730, such as a receiver 106, receiver hub 108 or a receiver processing distribution system 110 may include a data processing module 732, a processing module 700, and user interface 708. At 1002, the data processing module 732 may be configured to cause the processor 702 of the processing module 700 to receive tag blink data packet from the communication circuitry 706. The communication circuitry 706 may receive tag derived data from receivers 106. The tag derived data may include tag blink data packets, tag UID, a tag individual correlator, sensor data, sensor data metadata, tag-sensor correlators, or the like.

At 1004, the data processing module 732 may be configured to cause the processor 702 to calculate tag location data in a manner substantially similar to the calculation of tag location data of FIG. 1. Additionally, the processor 702 may calculate time data associated with the tag blink data packet.

At 1014, the data processing module 732 may be configured to cause the processor 702 to receive sensor data from the communication circuitry 706. The communication circuitry 706 may receive sensor data from sensors 203 or sensor receivers 166. The sensor receivers 166 may receive sensor data through a tag mesh network as a data backhaul from sensors 203 or mesh nodes 203*b-e*, or may receive sensor data directly from sensors 203 without the use of a tag mesh network.

At 1003 the data processing module 732 may be configured to cause the processor 702 to associate tag location data and/or time data associated with the tag blink data with the sensor data. The processor 702 may associate location data or time data with sensor data based on sensor data being a portion of the tag blink data packet. Additionally or alternatively, the processor 702 may associate location or time data with a sensor data based on a tag-sensor correlator or a sensor data metadata of the tag blink data packet identifying a received sensor data. For example, if a sensor data is received the processor 702 may use the sensor metadata to identify the sensor data and associate the sensor data with the location or time data of the tag blink data in which the sensor metadata was received. In an example embodiment the sensor data and/or sensor metadata may include a sensor data UID for association of the sensor data to the tag blink data. For example the sensor data may have a sensor data UID of 11635 and the sensor data may have a sensor data UID of 11635. The processor 702 may compare the sensor data UIDs and associate matching sensor data UIDs.

At 1006, the data processing module 732 may be configured to cause the processor 702 to sequence sensor data. In an instance in which the sensor data has been segmented and associated with a sensor data UID as discussed in FIG. 8, the sensor data may arrive as individual sensor data segments which may or may not be in the correct order. The sensor metadata and sensor data may include a sensor data UID to identify the order of the segmented sensor data. The processor 702 may identify the sensor data segments by the sensor metadata and/or the sensor data UID and sequence the sensor data in the correct order. For example, if the received sensor data has sensor data UIDs 11635, 11634, and 11636, the processor may identify the order of the sensor data UIDs of the sensor metadata such as 11634, 11635, 11636. The processor 702 may sequence the received sensor data in the order designated by the sensor metadata, 11634, 11635, 11636. The example includes sequential numbers, but one skilled in the art would understand that sensor data UIDs may be any value, including sequential numbers, hexadecimal values, Unicode characters, or any combination of these.

At 1007, the data processing module 732 may be configured to cause the processor 702 to synchronize the tag location and time data with the sensor data. The processor 702 may use the association of sensor data and tag location and time data at 1003 to synchronize the sensor data with the tag location and time data. The processor 702 may use time notations in each data to mark synchronization at each point associated with a tag blink data. Additionally or alternatively, the processor 702 may generate a single data file including both the tag location and time data and the sensor data. The synchronization may be used later by the processor for display of the tag location data and sensor data at 1010.

At 1008, the data processing module 732 may be configured to cause the processor 702 to receive an indication of selected sensor data. Sensor data may be selected manually by a user using a user interface 708. The processor 702 may receive an indication of the selected sensor data from the user interface 708. The processor 702 may correlate the selected sensor data indication with the respective sensor data. In an example embodiment, the processor 702 may automatically determine and select sensor data based on associated tag location data, tag location and time data, or other criteria. For example, sensor data associated with tags which are within the monitored area, or on an event field during a play, or behind a line of scrimmage.

In an event in which the selected sensor data has not been received, such as data that is not normally transmitted, the data processing module 732 may be configured to request sensor data at 1111. The processor 702 may cause the communication circuitry 706 to transmit a sensor data request. The sensor data request may be transmitted by a receiver sensor 166 equipped with a transceiver, or by energizing exciters such as 112. The process may continue at 1002 and/or 1014 receiving tag blink data packets and sensor data.

At 1010, the data processing module 732 may be configured to cause the processor 702 to cause tag location and/or selected sensor data to be displayed on a user interface 708. The sensor data may be displayed by itself, with other sensor data, or location data. For example, participant heart rate and temperature may be selected. The processor 702 may cause the user interface 708 to display the participant tag location with an overlay or breakout of heart rate and/or temperature.

In an example embodiment, the sensor data may be audio or video data. The processor 702 may cause the display of the tag location data with the audio data or video data in a breakout or image overlay. In an example embodiment, the tag location may be displayed with the acceleration or other environmental data. In another example embodiment, tag location data may be displayed and selected sensor data may be displayed as a thumbnail picture of data associated with the tag.

In an example embodiment in which the sensor data has been synchronized by time notation, the processor 702 may display the sensor data and location data by synchronizing or matching the time notations. In an example embodiment in which the synchronization at 1007 created a combined location and sensor data the processor may cause the user interface 708 to display the combined data instead of simultaneous display of the two separate location and sensor data.

At 1012, the data processing module 732 may be configured to cause the processor 702 to cause tag location data and/or selected sensor data to be stored in a memory such as 704. The processor 702 may store only selected tag location data or selected sensor data. In an example embodiment the processor 702 stores any combination of sensor data and tag location data, including all received sensor and location data in a memory 704 for later analytics for system diagnostics.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   generating a tag-sensor correlator indicative of an association between a sensor and a radio frequency (RF) location tag, wherein:
   the sensor includes a first transmitter configured to wirelessly transmit signals to a first type of wireless receiver,
   the RF location tag includes a second transmitter configured to wirelessly transmit blink data packets to a second type of wireless receiver different than the first type of wireless receiver, and
   the second type of wireless receiver is configured to measure times of arrival corresponding to the blink data packets;
   generating, using the sensor, sensor data including an environmental measurement; transmitting the environmental measurement from the sensor directly to the first type of wireless receiver;
   generating sensor metadata that identifies the sensor data; and
   transmitting the sensor metadata from the sensor to the RF location tag, wherein the RF location tag is to transmit the sensor metadata to the second type of wireless receiver, and the tag-sensor correlator is used by a processor to associate the environmental measurement with location data derived from the blink data packets transmitted by the second transmitter and generated by the RF location tag.

2. The method of claim 1 further comprising receiving origin node sensor data through a mesh network, and transmitting the origin node sensor data.

3. The method of claim 2 further comprising determining if the origin node sensor data satisfies a predetermined message count threshold, wherein the transmitting of the origin node sensor data is responsive to the determination of the origin node sensor data satisfying the predetermined message count threshold.

4. The method of claim 3, wherein the message count threshold is a transmission count.

5. The method of claim 3, wherein the message count threshold is a time count.

6. The method of claim 3, wherein the message count threshold is based on the environmental measurement.

7. The method of claim 3, wherein the message count threshold is based on an object associated with the RF location tag.

8. The method of claim 1, wherein the transmitting of the environmental measurement is via Bluetooth low energy.

9. The method of claim 1, wherein the transmitting of the environmental measurement is via Wi-Fi.

10. The method of claim 1, wherein the transmitting of the environmental measurement is via near field communication.

11. The method of claim 1 further comprising:
    segmenting the environmental measurement; and
    associating a sensor data identifier to the segmented environmental measurement, wherein the sensor metadata comprises the sensor data identifier of the segmented environmental measurement.

12. The method of claim 1 further comprising setting a sensor data float value, wherein the generating the sensor data including the environmental measurement is based on the sensor data float value.

13. The method of claim 1 further comprising:
    setting a sensor data threshold value; and
    determining if the environmental measurement satisfies the sensor data threshold value, wherein the transmitting of the environmental measurement is responsive to the determination of the environmental measurement satisfying the sensor data threshold value.

14. The method of claim 1 further comprising determining receipt of a transmission reliability signal, wherein the transmitting of the sensor data including environmental measurement is responsive to the determination of receipt of the transmission reliability signal.

15. The method of claim 1, wherein the transmitting of the environmental measurement comprises:
    determining whether a transmission reliability signal is received;
    when the transmission reliability signal is received, transmitting the environmental measurement directly to the first type of receiver; and
    when the transmission reliability signal is not received, transmitting the environmental measurement to the first type of receiver through nodes of a mesh network.

16. An apparatus comprising at least one processor and at least one memory including computer program code, the at least one memory and computer program code configured to, with the processor, cause the apparatus to:
    generate a tag-sensor correlator indicative of an association between a sensor and a radio frequency (RF) location tag, wherein:
    the sensor includes a first transmitter configured to wirelessly transmit signals to a first type of wireless receiver,
    the RF location tag including a second transmitter configured to wirelessly transmit blink data packets to a second type of wireless receiver different than the first type of wireless receiver, and
    the second type of wireless receiver is configured to measure times of arrival corresponding to the blink data packets;
    generate, using the sensor, sensor data including an environmental measurement;
    transmit the environmental measurement from the sensor directly to the first type of wireless receiver;

generate sensor metadata that identifies the sensor data; and transmit the sensor metadata from the sensor to the RF location tag, wherein the RF location tag is to transmit the sensor metadata to the second type of wireless receiver, and the tag-sensor correlator is used by a computing device to associate the environmental measurement with location data derived from the blink data packets transmitted by the second transmitter and generated by the RF location tag.

17. The apparatus of claim 16, wherein the at least one memory and computer program code are configured to, with the processor, cause the apparatus to:

receive origin node sensor data through a mesh network, and transmit the origin node sensor data.

18. The apparatus of claim 17, wherein the at least one memory and computer program code are configured to, with the processor, cause the apparatus to:

determine if the origin node sensor data satisfies a predetermined message count threshold, wherein the transmitting of the origin node sensor data is based on the origin node sensor data satisfying the predetermined message count threshold.

19. The apparatus of claim 18, wherein the message count threshold is a transmission count.

20. The apparatus of claim 18, wherein the message count threshold is a time count.

21. The apparatus of claim 18, wherein the message count threshold is based on the environmental measurement.

22. The apparatus of claim 18, wherein the message count threshold is based on an object associated with the RF location tag.

23. The apparatus of claim 16, wherein the at least one memory and computer program code are configured to, with the processor, cause the apparatus to transmit the environmental measurement via Bluetooth low energy.

24. The apparatus of claim 16, wherein the at least one memory and computer program code are configured to, with the processor, cause the apparatus to transmit the environmental measurement via Wi-Fi.

25. The apparatus of claim 16, wherein the at least one memory and computer program code are configured to, with the processor, cause the apparatus to transmit the environmental measurement via near field communication.

26. The apparatus of claim 16, wherein the at least one memory and computer program code are configured to, with the processor, cause the apparatus to:

segment the environmental measurement; and associate a sensor data identifier to the segmented environmental measurement, wherein the sensor metadata comprises the sensor data identifier of the segmented environmental measurement.

27. The apparatus of claim 16, wherein the at least one memory and computer program code are configured to, with the processor, cause the apparatus to:

set a sensor data float value, wherein the generating of the sensor data including the environmental measurement is based on the sensor data float value.

28. The apparatus of claim 16, wherein the at least one memory and computer program code are configured to, with the processor, cause the apparatus to:

set a sensor data threshold value; and determine if the environmental measurement satisfies the sensor data threshold value, wherein the transmitting of the environmental measurement is based on the determination of the environmental measurement satisfying the sensor data threshold value.

29. The apparatus of claim 16, wherein the at least one memory and computer program code are configured to, with the processor, cause the apparatus to:

determine receipt of a transmission reliability signal, wherein the transmitting of the environmental measurement is based on the receipt of the transmission reliability signal.

30. A computer program product comprising a non-transitory computer readable medium having program code portions stored thereon, the program code portions configured, upon execution to:

generate a tag-sensor correlator indicative of an association between a sensor and a radio frequency (RF) location tag, wherein:

the sensor includes a first transmitter configured to wirelessly transmit signals to a first type of wireless receiver, the RF location tag including a second transmitter configured to wirelessly transmit blink data packets to a second type of wireless receiver different than the first type of wireless receiver, and the second type of wireless receiver is configured to measure times of arrival corresponding to the blink data packets;

generate sensor data including an environmental measurement using the sensor; transmit the environmental measurement from the sensor directly to the first type of wireless receiver:

generate sensor metadata that identifies the sensor data: and transmit the sensor metadata from the sensor to the RF location tag, wherein the RF location tag is to transmit the sensor metadata to the second type of wireless receiver, and the tag-sensor correlator is used by a processor to associate the environmental measurement with location data derived from the blink data packets transmitted by the second transmitter and generated by the RF location tag.

31. The computer program product according to claim 30, wherein the program code portions are configured, upon execution to:

receive origin node sensor data through a mesh network and transmit the origin node sensor data.

32. The computer program product according to claim 31, wherein the program code portions are configured, upon execution to:

determine if the origin node sensor data satisfies a predetermined message count threshold, wherein the transmitting of the origin node sensor data is based on the origin node sensor data satisfying the predetermined message count threshold.

33. The computer program product of claim 32, wherein the message count threshold is a transmission count.

34. The computer program product of claim 32, wherein the message count threshold is a time count.

35. The computer program product of claim 32, wherein the message count threshold is based on the environmental measurement.

36. The computer program product of claim 32, wherein the message count threshold is based on an object associated with the RF location tag.

37. The computer program product of claim 30, wherein the transmitting of the environmental measurement is via Bluetooth low energy.

38. The computer program product of claim 30, wherein the transmitting of the environmental measurement is via Wi-Fi.

39. The computer program product of claim 30, wherein the transmitting of the environmental measurement is via near field communication.

40. The computer program product according to claim 30, wherein the program code portions are configured, upon execution to:
segment the environmental measurement; and
associate a sensor data identifier to the segmented environmental measurement, wherein the sensor metadata comprises the sensor data identifier of the segmented environmental measurement.

41. The computer program product according to claim 30, wherein the program code portions are configured, upon execution to:
set a sensor data float value, wherein the generating of the sensor data including the environmental measurement is based on the sensor data float value.

42. The computer program product according to claim 30, wherein the program code portions are configured, upon execution to:
set a sensor data threshold value; and
determine if the environmental measurement satisfies the sensor data threshold value, wherein the transmitting of the environmental measurement is based on the environmental measurement satisfying the sensor data threshold value.

43. The computer program product according to claim 30, wherein the program code portions are configured, upon execution to:
determine receipt of a transmission reliability signal, wherein the transmitting of the environmental measurement is based on the receipt of the transmission reliability signal.

* * * * *